(12) United States Patent
Hwang et al.

(10) Patent No.: US 10,397,539 B2
(45) Date of Patent: Aug. 27, 2019

(54) COMPENSATING 3D STEREOSCOPIC IMAGERY

(71) Applicant: SCHEPENS EYE RESEARCH INSTITUTE, Boston, MA (US)

(72) Inventors: Daejoon Alex Hwang, Boston, MA (US); Eliezer Peli, Boston, MA (US)

(73) Assignee: Schepens Eye Research Institute, Boston, MA (US)

( * ) Notice: Subject to any disclaimer, the term of this patent is extended or adjusted under 35 U.S.C. 154(b) by 0 days.

(21) Appl. No.: 15/506,638

(22) PCT Filed: Aug. 24, 2015

(86) PCT No.: PCT/US2015/046589
§ 371 (c)(1),
(2) Date: Feb. 24, 2017

(87) PCT Pub. No.: WO2016/032973
PCT Pub. Date: Mar. 3, 2016

(65) Prior Publication Data
US 2017/0295353 A1  Oct. 12, 2017

Related U.S. Application Data

(60) Provisional application No. 62/056,952, filed on Sep. 29, 2014, provisional application No. 62/041,524, filed on Aug. 25, 2014.

(51) Int. Cl.
*G01S 7/20* (2006.01)
*H04N 13/122* (2018.01)
(Continued)

(52) U.S. Cl.
CPC ............ *H04N 13/122* (2018.05); *G06T 3/00* (2013.01); *G06T 5/006* (2013.01); *H04N 13/144* (2018.05);
(Continued)

(58) Field of Classification Search
CPC . G06T 5/006; G06T 2207/10012; G06T 3/00; H04N 13/0018; H04N 13/0033; H04N 13/0404; H04N 13/305
(Continued)

(56) References Cited

U.S. PATENT DOCUMENTS

2003/0184868 A1* 10/2003 Geist ................... G02B 27/0172
359/630
2007/0248260 A1* 10/2007 Pockett ................ H04N 13/327
382/154
2015/0077586 A1* 3/2015 Woodman .............. G09G 5/005
348/222.1

OTHER PUBLICATIONS

Hwang et al., "An augmented-reality edge enhancement application for google glass," Optometry and vision science, 91(8): 1021-1030, Aug. 2014.
(Continued)

*Primary Examiner* — Behrooz M Senfi
(74) *Attorney, Agent, or Firm* — Fish & Richardson P.C.

(57) ABSTRACT

The disclosure features three-dimensional stereoscopic imaging systems and methods that include two image capture devices configured to obtain images of a scene, at least one display screen, and an electronic processor configured to: receive one or more images of the scene from the capture devices, where each of the one or more images includes a lateral dimension and a height; warp the one or more images along their respective lateral dimensions to at least partially correct for disparity distortions associated with displaying the one or more images on the at least one display screen; correct the one or more images by scaling the respective heights of the images along the lateral dimensions of the images so that the height of each image is the same along the images lateral dimension; and display the warped and corrected one or more images on the at least one display screen.

17 Claims, 15 Drawing Sheets

(51) Int. Cl.
*G06T 3/00* (2006.01)
*G06T 5/00* (2006.01)
*H04N 13/383* (2018.01)
*H04N 13/344* (2018.01)
*H04N 13/144* (2018.01)
*H04N 13/366* (2018.01)
*H04N 13/239* (2018.01)
*H04N 13/337* (2018.01)
*H04N 13/305* (2018.01)
*H04N 13/341* (2018.01)
*H04N 13/334* (2018.01)

(52) U.S. Cl.
CPC ......... *H04N 13/239* (2018.05); *H04N 13/344* (2018.05); *H04N 13/366* (2018.05); *H04N 13/383* (2018.05); *G06T 2207/10012* (2013.01); *H04N 13/305* (2018.05); *H04N 13/334* (2018.05); *H04N 13/337* (2018.05); *H04N 13/341* (2018.05)

(58) Field of Classification Search
USPC .......................................................... 348/51
See application file for complete search history.

(56) References Cited

OTHER PUBLICATIONS

International Search Report and Written Opinion issued in Application No. PCT/US2015/046589, dated Dec. 9, 2015.
Shiwa et al., "Proposal for a 3-D display with accommodative compensation: 3DDAC," Journal of the society for information display—SID, Society for information display, 4(4): 255-261, Dec. 1996.
Southard et al., "Viewing model for virtual environment displays," Journal of electronic imaging, 4(4): 413-420, Oct. 1995.
Warren et al., "Computational model for the stereoscopic optics of a head-mounted display," Proceedings of Spie, 1457: 140-160, Jan. 1991.
Warren et al., "The visual display transformation for virtual reality," Presence: Teleoperators and virtual environments 4.1, 4(1): 1-23, Jan. 1995.

* cited by examiner

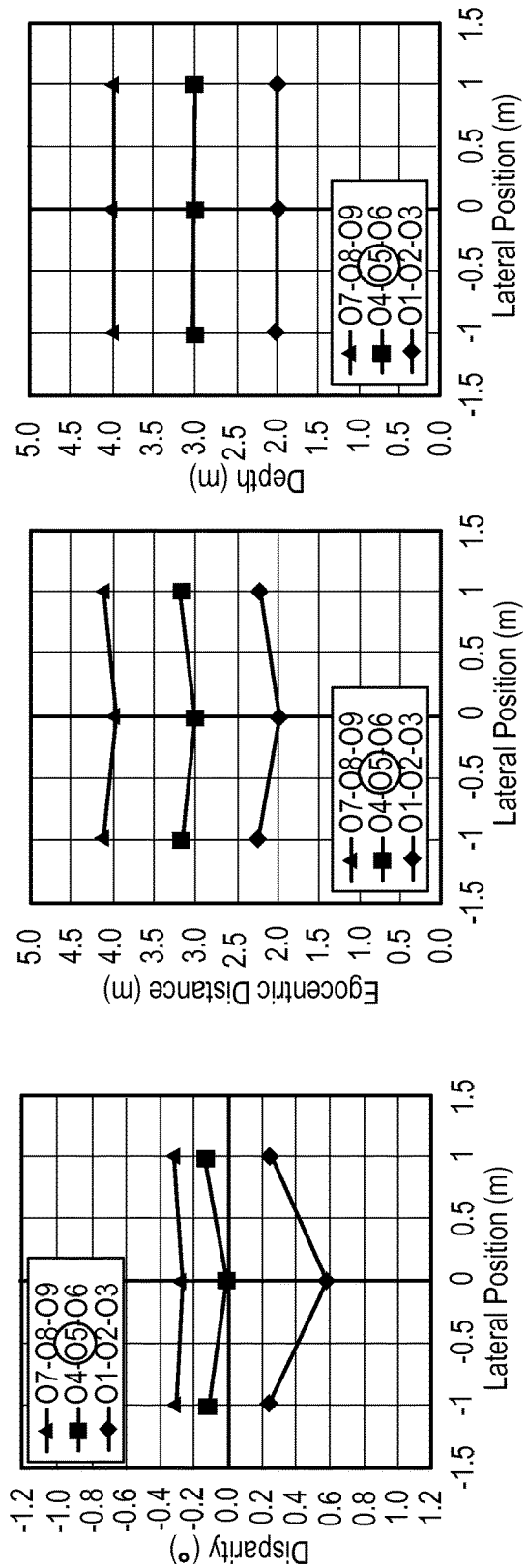

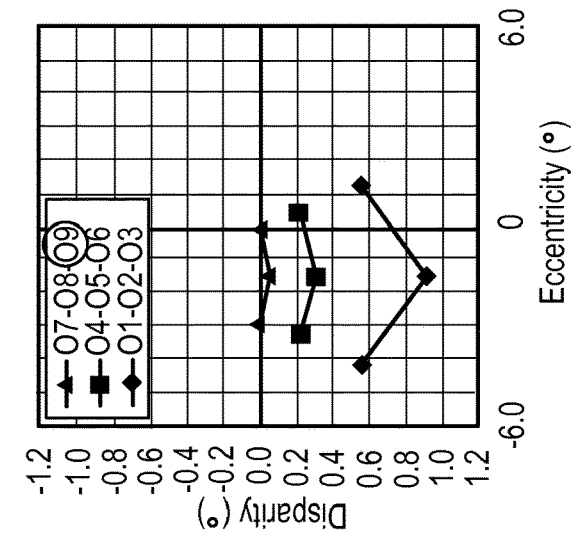
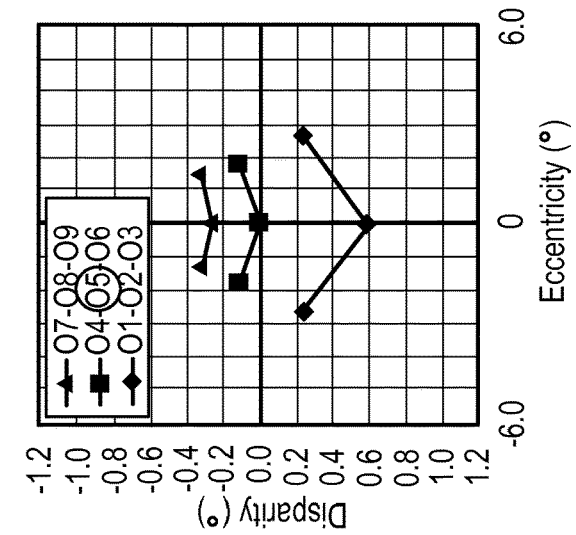
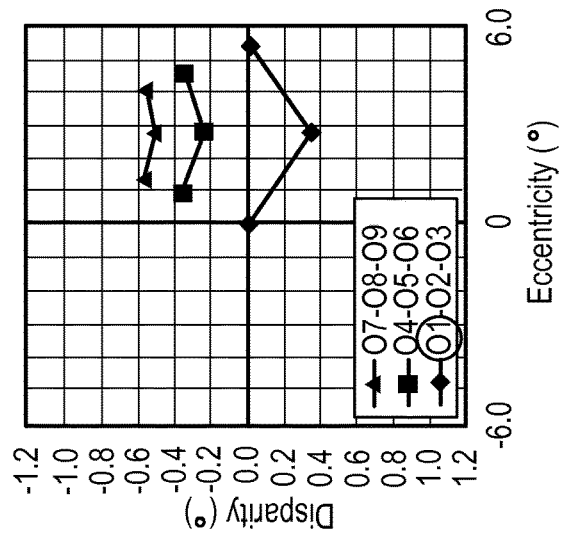

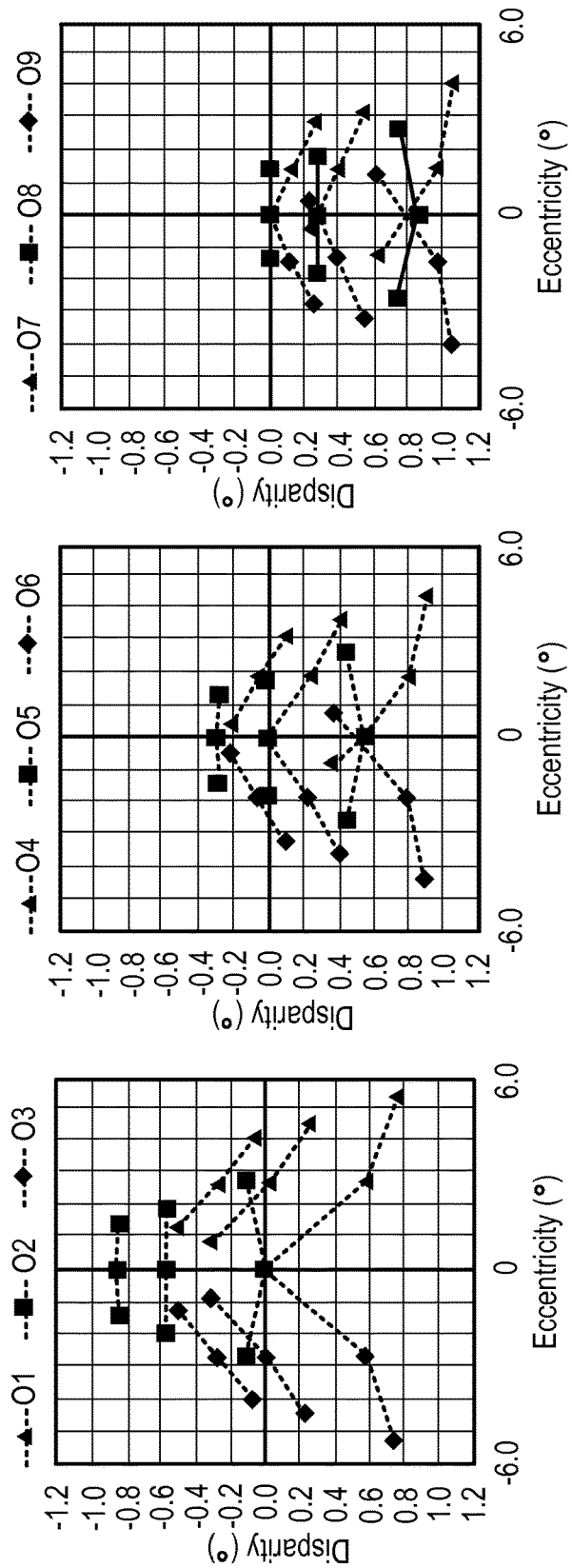

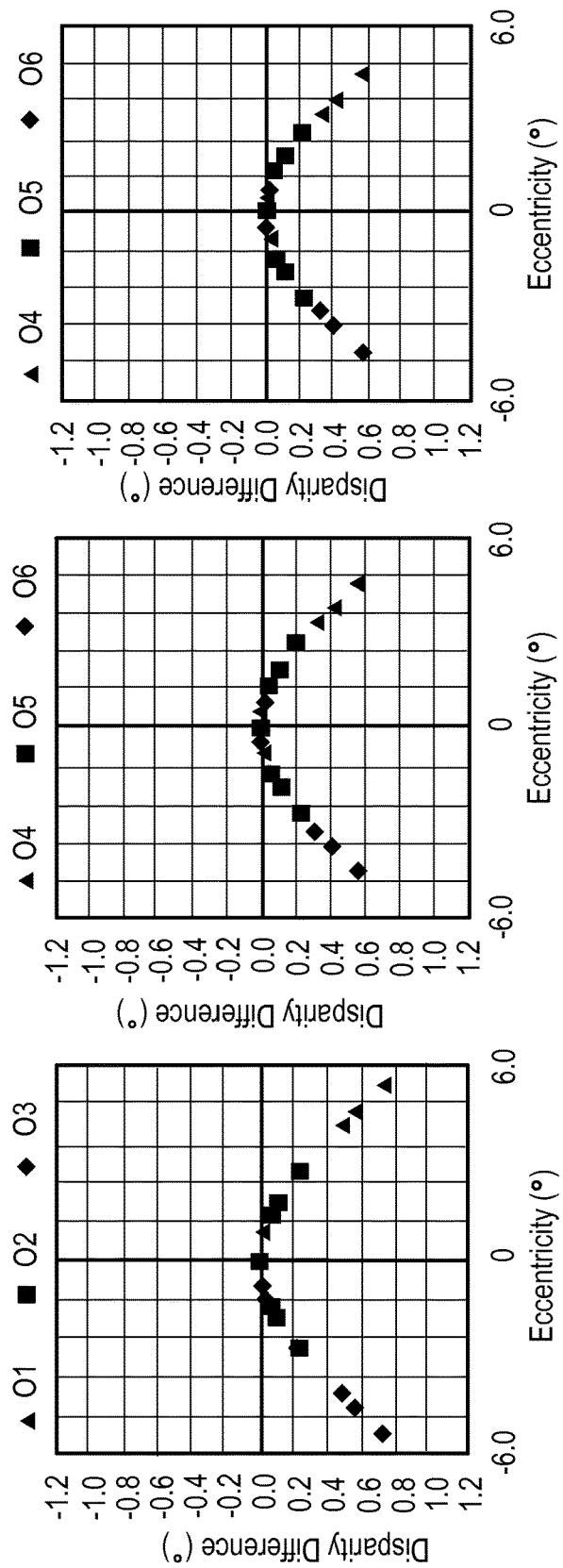

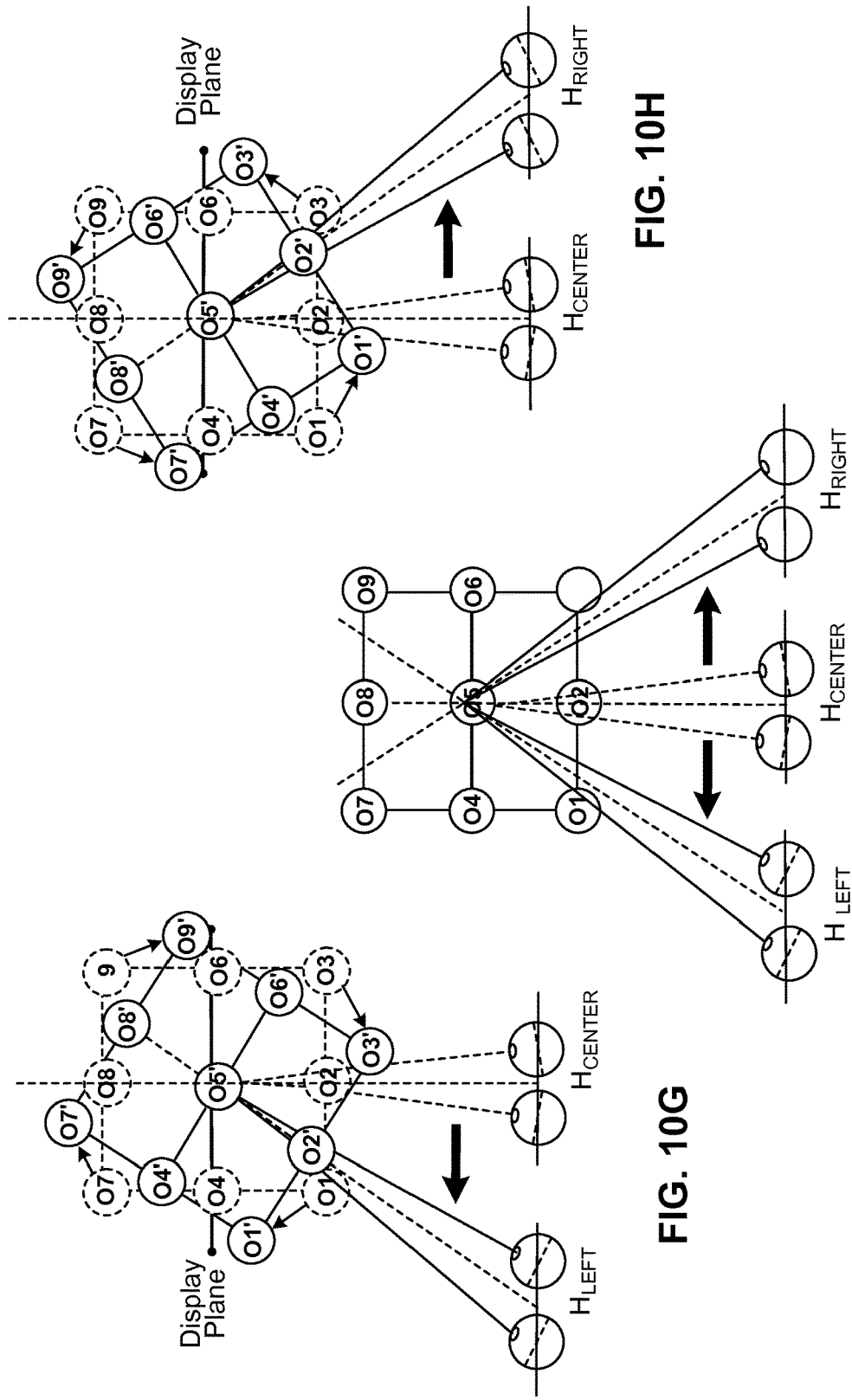

COMPENSATING 3D STEREOSCOPIC IMAGERY

CROSS-REFERENCE TO RELATED APPLICATIONS

This application is a 371 U.S. National Phase Application of PCT/US2015/046589 filed on Aug. 24, 2015, which claims priority under 35 U.S.C. § 119 to U.S. Provisional Patent Application No. 62/041,524, filed on Aug. 25, 2014, and to U.S. Provisional Patent Application No. 62/056,952, filed on Sep. 29, 2014, the entire contents of each of which are incorporated herein by reference.

STATEMENT AS TO FEDERALLY SPONSORED RESEARCH

This invention was made with Government support under NEI grant number EY12890 and NIH grant number R01EY05957. The Government has certain rights in the invention.

TECHNICAL FIELD

This disclosure relates to 3D stereoscopic imaging.

BACKGROUND

People view the 3-dimensional (3D) physical world without any particular discomfort. However, viewing stereoscopic displays frequently causes complaints of visual discomfort, including symptoms closely resembling motion sickness.

Visual discomfort symptoms such as eye strain, blurred vision, and double vision may be related to fundamental limitations of stereoscopic 3D (S3D) display technology that result in oculomotor conflict between accommodation and convergence demands, a difference between viewing distance to the screen (focal distance), and the distance to the virtual stereo images (convergence distance). Lack of naturally-occurring blur at different virtual distances may also result in visual discomfort. Studies of 3D visual discomfort with stereo displays have suggested that 2D image distortions during capture (e.g., lens distortion) and projection distortions of the scene (e.g., keystone distortion) cause localized misalignment between the left and right eye images, especially in the periphery. These distortions disrupt natural stereo fusion, and may increase overall 3D viewing discomfort.

SUMMARY

Although a variety of possible factors have been identified as causes of S3D discomfort, motion-sickness-related symptoms experienced during S3D viewing including light-headedness, dizziness, queasiness, nausea, and vomiting, cannot be explained directly by the current understanding of the oculomotor conflict, or lack of relative blur. The present disclosure discusses the manner in which the chain of 3D stereoscopic image capture and display causes dynamic depth distortion in stereo image motion, which results in spatiotemporal cue conflicts in depth perception of the displayed environment, and further, the manner in which the viewer's head movements cause perceptual instability of the displayed visual world and high-level cue conflicts. In addition, the disclosure features systems and methods for reducing such distortions and, as a consequence, for reducing the associated perceptual instabilities. As such, the methods and systems disclosed herein can assist in relieving motion sickness-type symptoms for persons viewing 3D stereoscopic images, and in particular, 3D stereoscopic images of moving scenes.

In general, in a first aspect, the disclosure features three-dimensional stereoscopic imaging systems that include two image capture devices configured to obtain images of a scene, at least one display screen, and an electronic processor configured to: receive one or more images of the scene from the capture devices, where each of the one or more images includes a lateral dimension and a height; warp the one or more images along their respective lateral dimensions to at least partially correct for disparity distortions associated with displaying the one or more images on the at least one display screen; correct the one or more images by scaling the respective heights of the images along the lateral dimensions of the images so that the height of each image is the same along the image's lateral dimension; and display the warped and corrected one or more images on the at least one display screen.

Embodiments of the systems can include any one or more of the following features.

The electronic processor can be configured to warp the one or more images by applying a non-linear warping function to the one or more images. The electronic processor can be configured to warp the one or more images by applying a linear warping function to the one or more images. The electronic processor can be configured to scale the respective heights of the images according to a linear scaling function. The electronic processor can be configured to scale the respective heights of the images according to a non-linear scaling function.

Each of the two image capture devices can be configured to obtain an image of the scene, where the two image capture devices are positioned so that the images obtained by the devices correspond to different viewing directions. The different viewing directions can correspond to left and right viewing directions, relative to a position of a user of the system. The at least one display screen can include two display screens, and the electronic processor can be configured to display a first one of the warped and corrected images on a first one of the display screens, and to display a second one of the warped and corrected images on a second one of the display screens. The first display screen can correspond to the left viewing direction, and the second display screen can correspond to the right viewing direction.

Each of the at least one display screens can have a fixed orientation. Each of the at least one display screens can be configured to pivot about an axis, and the electronic controller can be configured to adjust an orientation of each of the at least one display screens about its pivot axis prior to displaying the warped one or more images. The electronic processor can be configured to synchronously adjust the orientations of each of the at least one display screens based on viewing directions associated with the two image capture devices. The first and second display screens can be configured to pivot about first and second axes respectively, and the electronic processor can be configured to adjust orientations of the first and second display screens relative to the first and second axes based on the left and right viewing directions.

In some implementations the systems can be configured as a head-mounted display. The electronic processor can be configured to correct one or more or each of the one or more images for lens-induced aberrations by applying a correction function to the one or more images.

The systems can include a tracking apparatus configured to detect a shift of a head of a user of the system. The tracking apparatus can include at least one camera configured to track eye movements of the user of the systems. The tracking apparatus can be configured to transmit information about changes in a position of the user's head to the electronic processor, and the electronic processor can be configured to warp the one or more images based on the transmitted information.

The warping function can be derived from ray-tracing analysis of distortions in imaging paths along which the image capture devices are positioned. The warping function can include corrections corresponding to at least some of the distortions.

Embodiments of the systems can also include any of the other features or aspects disclosed herein, including features and aspects disclosed in connection with different embodiments, in any combination as appropriate.

In another aspect, the disclosure features methods of correcting stereoscopic images. The methods include obtaining one or more images of a scene, where each of the one or more images includes a lateral dimension and a height, warping the one or more images along their respective lateral dimensions to at least partially correct for disparity distortions associated with displaying the one or more images on at least one display screen, correcting the one or more images by scaling the respective heights of the images along the lateral dimensions of the images so that the height of each image is the same along the image's lateral dimension, and displaying the warped and corrected one or more images on at least one display screen.

Embodiments of the methods can include any one or more of the following features.

The methods can include warping the one or more images by applying a non-linear warping function to the one or more images. The methods can include warping the one or more images by applying a linear warping function to the one or more images. The methods can include scaling the respective heights of the images according to a linear scaling function. The methods can include scaling the respective heights of the images according to a non-linear scaling function.

The one or more images of the scene can include two images of the scene, and the two images can correspond to different viewing directions of the scene. The different viewing directions can correspond to left and right viewing directions, relative to a position of a user viewing the warped and corrected one or more images. The methods can include displaying the warped and corrected image corresponding to the left viewing direction on a first display screen, and displaying the warped and corrected image corresponding to the right viewing direction on a second display screen.

Each of the at least one display screens can have a fixed orientation. The methods can include adjusting an orientation of each of the at least one display screens about a corresponding pivot axis prior to displaying the warped one or more images. The methods can include synchronously adjusting the orientations of each of the at least one display screens based on viewing directions associated with the one or more images of the scene. The first and second display screens can be configured to pivot about first and second axes respectively, and the methods can include adjusting orientations of the first and second display screens relative to the first and second axes based on the left and right viewing directions.

The methods can include correcting one or more, e.g., each, of the one or more images for lens-induced aberrations by applying a correction function to each of the one or more images. The methods can include detecting a change in position of a head of a user viewing the warped one or more images. The methods can include warping the one or more images based on information about the change in position of the user's head. The warping function can be derived from ray-tracing analysis of distortions in imaging paths along which the one or more images are obtained. The warping function can include corrections corresponding to at least some of the distortions.

Embodiments of the methods can also include any of the other steps or features disclosed herein, including steps and features disclosed in connection with different embodiments, in any combination as appropriate.

In a further aspect, the disclosure features three-dimensional stereoscopic imaging systems that include two image capture devices configured to obtain images of a scene, at least one display screen, and an electronic processor configured to: receive one or more images of the scene from the capture devices, where each of the one or more images includes a lateral dimension and a height; warp the one or more images along their respective lateral dimensions to at least partially correct for disparity distortions associated with displaying the one or more images on the at least one display screen; and display the warped one or more images on the at least one display screen.

Embodiments of the systems can include any one or more of the following features.

The electronic processor can be configured to warp the one or more images by applying a non-linear warping function to the one or more images. The electronic processor can be configured to warp the one or more images by applying a linear warping function to the one or more images. The electronic processor can be configured to correct the one or more images by scaling the respective heights of the images along the lateral dimensions of the images so that the height of each image is the same along the image's lateral dimension. The electronic processor can be configured to scale the respective heights of the images according to a linear scaling function. The electronic processor can be configured to scale the respective heights of the images according to a non-linear scaling function.

Embodiments of the systems can also include any of the other features and aspects disclosed herein, including features and aspects disclosed in connection with different embodiments, in any combination as appropriate.

In another aspect, the disclosure features methods of correcting stereoscopic images, the methods including obtaining one or more images of a scene, where each of the one or more images includes a lateral dimension and a height, warping the one or more images along their respective lateral dimensions to at least partially correct for disparity distortions associated with displaying the one or more images on at least one display screen, and displaying the warped one or more images on at least one display screen.

Embodiments of the methods can include any one or more of the following features.

The methods can include warping the one or more images by applying a non-linear warping function to the one or more images. The methods can include warping the one or more images by applying a linear warping function to the one or more images. The methods can include correcting the one or more images by scaling the respective heights of the images along the lateral dimensions of the images so that the height of each image is the same along the image's lateral dimension. The methods can include scaling the respective heights of the images according to a linear scaling function. The methods can include scaling the respective heights of the images according to a non-linear scaling function.

Embodiments of the methods can also include any of the other steps and features disclosed herein, including steps and features disclosed in connection with different embodiments, in any combination as appropriate.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the subject matter herein, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments are set forth in the accompanying drawings and the description below. Other features and advantages will be apparent from the description, drawings, and claims.

DESCRIPTION OF DRAWINGS

FIG. 3A is a graph of angular disparity as a function of lateral position for each of the nine objects of FIG. 2, with the left and right eyes fixated on one of the objects.

FIG. 3B is a graph of egocentric distance to each of the nine objects of FIG. 2 as a function of lateral position, with the left and right eyes fixated on one of the objects.

FIG. 3C is a graph of depth of each of the nine objects of FIG. 2 as a function of lateral position, with the left and right eyes fixated on one of the objects.

FIG. 4A is a graph of angular disparity as a function of eccentricity for each of the nine objects of FIG. 2, with the left and right eyes fixated on one of the objects in the first row.

FIG. 4B is a graph of angular disparity as a function of eccentricity for each of the nine objects of FIG. 2, with the left and right eyes fixated on one of the objects in the second row.

FIG. 4C is a graph of angular disparity as a function of eccentricity for each of the nine objects of FIG. 2, with the left and right eyes fixated on one of the objects in the third row.

FIG. 9A is a graph of angular disparity as a function of eccentricity for all nine objects in FIG. 2, with gaze positions corresponding to each of the three objects in the first row.

FIG. 9B is a graph of angular disparity as a function of eccentricity for all nine objects in FIG. 2, with gaze positions corresponding to each of the three objects in the second row.

FIG. 9C is a graph of angular disparity as a function of eccentricity for all nine objects in FIG. 2, with gaze positions corresponding to each of the three objects in the third row.

FIG. 9G is a graph showing the arithmetic difference in disparity as a function of eccentricity between FIG. 9A and FIG. 9D.

FIG. 9H is a graph showing the arithmetic difference in disparity as a function of eccentricity between FIG. 9B and FIG. 9E.

FIG. 9I is a graph showing the arithmetic difference in disparity as a function of eccentricity between. FIG. 9C and FIG. 9F.

FIGS. 10G and 10H are schematic diagrams showing perceived depth axis rotation as the viewer's head moves left and right, respectively, when viewing the objects of FIG. 2 in a stereoscopic three-dimensional image.

FIG. 10I is a schematic diagram showing a stable depth axis as the viewer's head moves left and right when naturally viewing the objects of FIG. 2.

Like reference symbols in the various drawings indicate like elements.

DETAILED DESCRIPTION

Introduction—Visually Induced Motion Sickness

Figure 1:
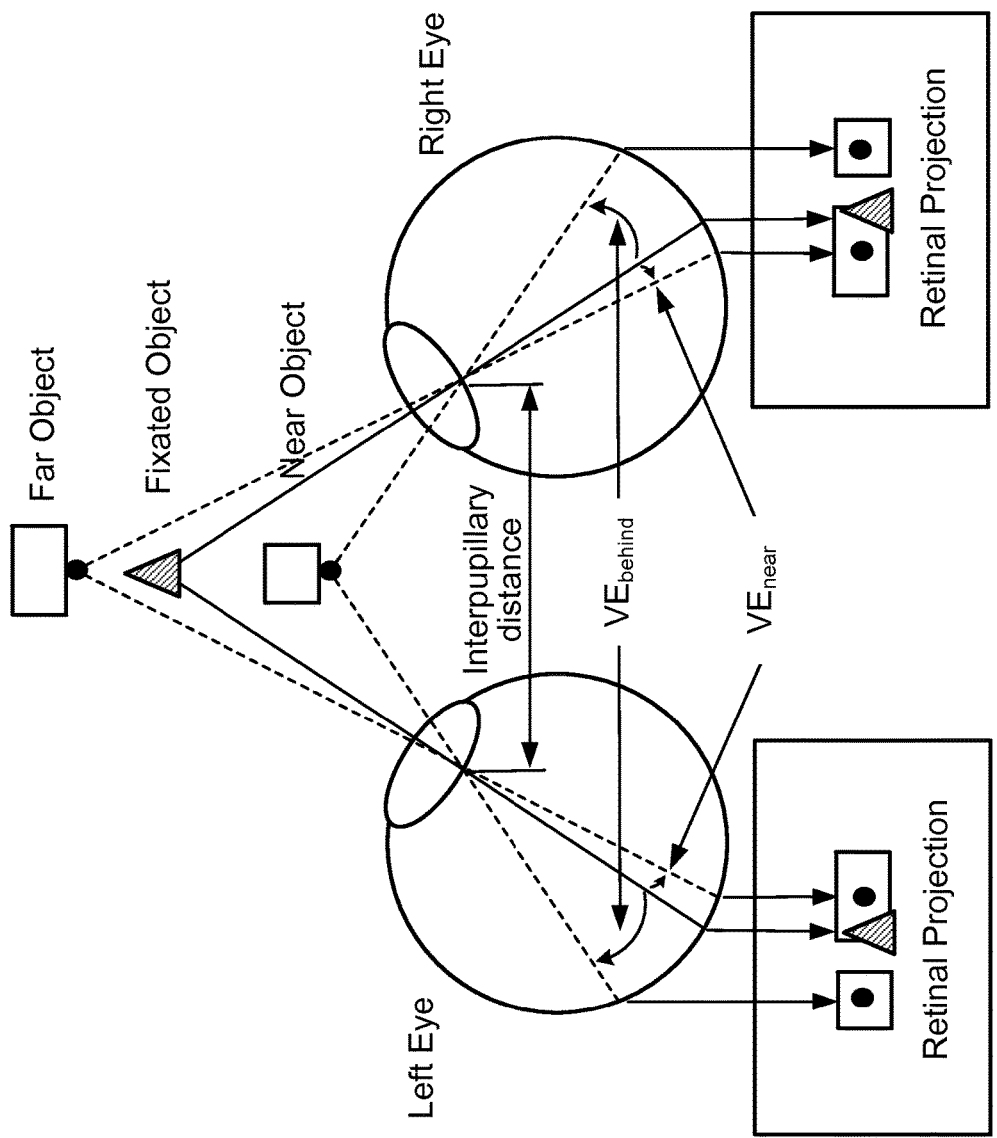
FIG. 1 is a schematic diagram showing the projection of objects in left and right eyes.

Symptoms of visually induced motion sickness (VIMS) are reported in both 2D and stereoscopic three-dimensional (S3D) presentations (in movies or video games), but it has been reported that S3D stimuli cause significantly higher levels of discomfort than 2D stimuli. A linkage of S3D and VIMS has been suggested, but with no direct explanation for why S3D would cause VIMS.

VIMS is generally explained as a physiological response elicited by sensory conflicts between two different motion signals, usually one from the vestibular system and the other from the visual system, although other sensory combinations are possible. This conflict of motion signals is presumed to cause perceptual stress during the information integration process, and provoke poison response-like symptoms such as light headedness, spatial disorientation, nausea, and purging of stomach contents. Similar conflict may occur when a person watches a 2D movie that induces a strong self-motion signal (an abrupt camera motion, for example), while the vestibular system generates almost no self-motion signal (since the viewer is at rest). These two sources of motion information, which are well-synchronized during normal activity in natural environments, need to be reconciled by the brain to make a correct judgment of self-motion and positioning to maintain postural stability. When one signal contains strong self-motion and the other signal produces no-self-motion, the information conflict invokes motion sickness symptoms. The accumulation of such contradictory signals over time may trigger severe VIMS.

As an extension of the original sensory conflict theory, the sensory rearrangement theory has been proposed, and includes a wider range of possible causes of conflicts by introducing the concept of a sensory comparator that matches the current sensory inputs with a stored trace of motion information expected based on previous experiences with the spatial environment, the exposure-history. In this theory, if there is a discrepancy between the present sensory input and the exposure history, a mismatch signal is generated and may trigger motion sickness symptoms. Continuous interactions with such nausiogenic stimuli eventually register the new experience as a new type of sensory pattern, which needs to follow its own sensory integration rule. This sensory rearrangement and comparator adaptation results in the eventual dissipation of VIMS symptoms. The original sensory conflict theory did not include an adaptation mechanism, and could not explain why motion sickness symptoms can be overcome by repeated experience (e.g., by sailors and pilots).

Causes of motion sickness are not limited to the low level inter-sensory conflicts between visual and vestibular signals, but may also be caused by some combination of dynamic distortions in the projected scenery, visual-visual intra-sensory conflict, where the perceived directional changes and angular rate of motion contain dynamic errors.

The sensory rearrangement theory can be applied to explain everyday experiences. For example, when new spectacles are fitted, people sometimes experience nausea, vertigo, and other motion-sickness-related symptoms for the first several days of wear, presumably due to perceived distortion created by the prismatic (or other optical) effects of refractive lenses. Dynamic distortions of the retinal image as subjects move (whether or not the lens corrects their vision) expose subjects to unaccustomed optic flows that violate the expected natural optic flows that have been built up throughout previous experiences. These effects are even more common and more dramatic with first fitting of progressive addition lenses that by design induce larger magnitude distortions than single-vision spectacle lenses. These symptoms subside as the wearers adapt to the new form of optical flow. This requires sensory rearrangement or adaptation, so that orientation and speed changes of unnatural optical flow are remapped to be perceived as natural. Returning to the old spectacle correction may cause a brief return of the discomfort, but with repeated alternation people are able to switch between these optical corrections (e.g., between contact lenses and spectacles) with no difficulty.

Perception of visual unnaturalness can arise from various motion cue conflicts. Under natural viewing conditions, the perceived size of an object follows linear perspective rules (e.g., an object moving toward the viewer enlarges in retinal projection), and the visual system utilizes this to estimate object motion in depth. However, in movies this natural expectation of size change can easily be manipulated by camerawork, as in contra- or Hitchcock-zooms. If a scene is recorded with a camera moving toward a near object while applying a zoom-out to keep the near object's angular size constant, this camerawork creates continuous perspective distortion, where the background scene appears to stretch backward while the size of the near object is kept constant. This creates perceptual inconsistency with purportedly rigid depth structure appearing to expand in depth, and the viewers of the scene experience strong visual cue conflicts. This technique was used in the movie Vertigo (1958) to simulate the main character's perceptual disorientation when looking down the tower stair shaft.

A study of S3D movie spectators found that about ¼ felt motion sickness symptoms and the symptoms lasted more than two hours after viewing the movie ended. Motion-sickness-related symptoms, such as dizziness, nausea, and disorientation, have been reported to be greater with S3D than 2D, young compared to old viewers, females compared to males, and from a central rather than an oblique seat location. Studies of non-stereoscopic 2D virtual reality (VR) environments conjectured that the apparent fidelity of more-immersive environments increases perceptual reality, and consequently intensify motion sickness. Although the increased perceptual reality of visual stimuli may explain to some degree the overall promotion of S3D motion sickness symptoms, it does not explain the S3D-specific motion sickness issues. These must be related to effects of motion in depth.

Stereo Depth Perception and Distortions

Monocular depth cues, such as occlusion, shading, motion parallax, accommodation, familiarity with object size, linear perspective, and texture density change, are effectively employed in depth perception. However, we perceive the world with two eyes, and our depth perception strongly relies on horizontal angular disparity of images falling on the retinas: stereo depth cues. In the physical world, monocular and stereo depth cues are in perfect agreement, and they are selectively combined to provide perceptual estimates of depth differences. Current S3D technology mainly uses depth-by-disparity (stereo) to add stereo depth cues. Two cameras are used to capture slightly different views of a scene, those captured scenes are separately presented to the corresponding eyes, and the viewer's brain extracts stereo depth information from the presented angular disparity and integrates it with monocular depth information available in the 2D images to perceive a consistent 3D world.

However, the stereo and monocular cues provided in this way are not always consistent, given the common S3D image capture/display/view process. These inconsistencies are a source of vision-to-vision conflicts that may be the cause of the VIMS associated with viewing S3D. These inconsistencies are more apparent with scene or viewer's motion.

When a person fixates on an object in space, both eyes are directed to that point, and the projection of the fixated point falls onto the fovea in each eye. This precise alignment is required to avoid diplopic (double) vision. If the fovea is assumed to be the center of the visual field, all other points in the space can be referenced via angular polar coordinates, with the radial distance known as the visual eccentricity (VE). For simplicity, the discussion herein focuses on points lying on the horizontal plane through the nodal points of the eyes, with no vertical offsets. The discussion can readily be extended to include vertical offsets, which merely complicate the geometric analysis but do not change the overall conclusions.

FIG. 1 is a schematic diagram showing the projection of objects in left and right eyes. Since the two eyes are separated horizontally by the interpupillary distance (IPD), the objects located in front or behind the fixated point will be projected at different visual eccentricities in each eye. In this case, the angular disparity (AD) of a point is defined as the difference between the visual eccentricities of the points projected on the left and right eyes. In other words, if one follows the fovea-centric angular coordinates, an AD can be computed by subtracting the VE of an object on the left eye from the VE of the same object on the right eye. As a result, the objects near/far relative to the fixated distance (along the direction of fixation) get positive/negative AD, respectively.

Note that since the fixated point in space is projected onto the reference position (fovea) of each eye, which are both at zero VE, and therefore the AD for the fixation point is also zero. In other words, the AD encodes the relative distance from the viewer of objects in the direction of the fixated object, referenced to zero at the fixated distance. Positive and negative VE values are measured by clockwise and counter-clockwise rotations from the center of the visual field (e.g., the fovea), respectively.

If the perception of object depth is assumed to be solely determined by the AD on a viewer's retinas, the viewer's perceived relative depth changes can be estimated by tracing the AD changes of the objects throughout the series of spatial mappings of the 3D display processing chain: scene capture (3D to 2D), image processing (2D to 2D), projection (2D to S3D), and perception (S3D to 3D).

Figure 2:
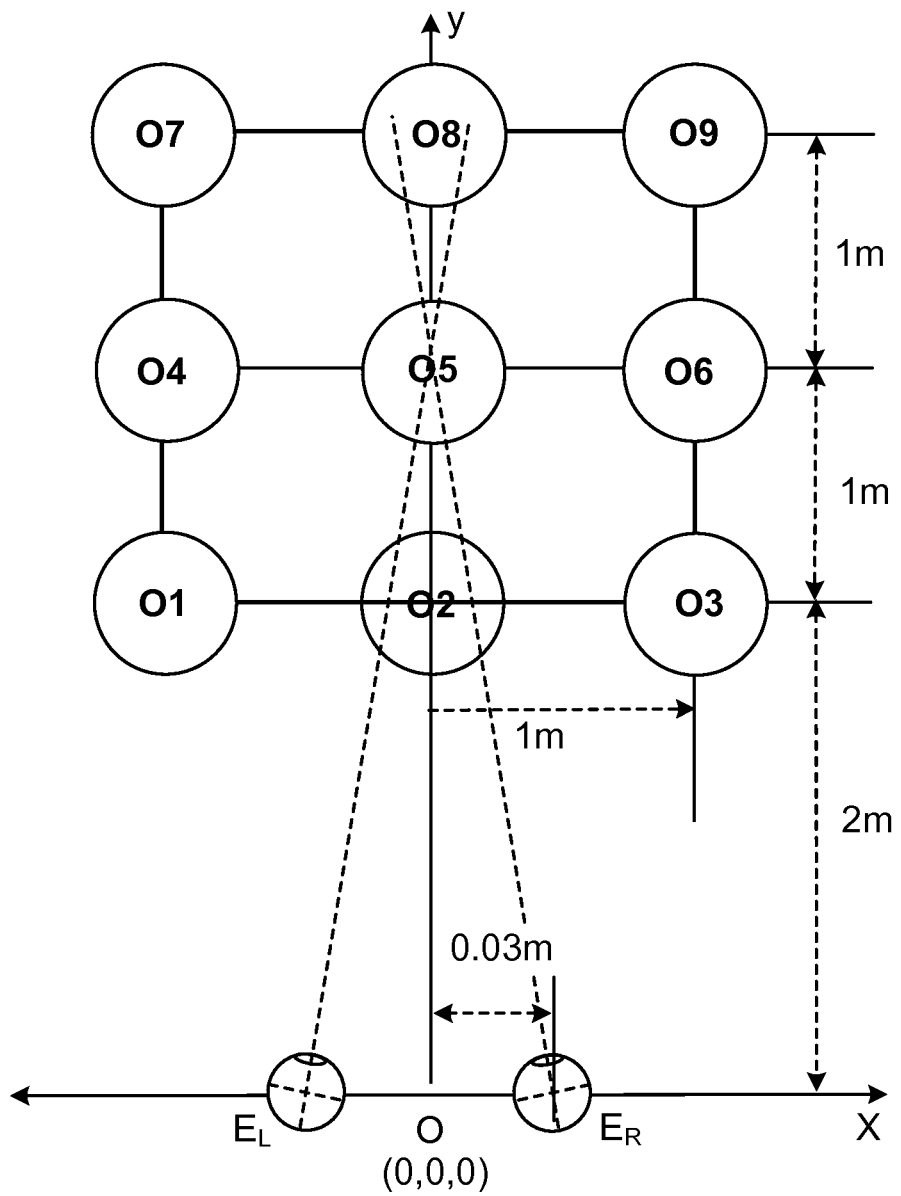
FIG. 2 is a schematic diagram showing an arrangement of nine objects that are observed by left and right eyes.

FIG. 2 is a schematic diagram showing a series of objects O1-O9 that are viewed by left and right eyes, $E_L$ and $E_R$, of a person. The positions of the objects in real 3D space are shown in FIG. 2. Objects O1 through O9 are arranged to be on an equally spaced rectilinear grid (in depth). The origin, O, of the world coordinates is located at the midpoint between the nodal points of the two eyes, and the distance to the nearest row of the grid from the origin is 2 m. Objects are spaced 1 m apart both horizontally (x axis) and in depth (y axis). The elevations of the objects and cameras are set at the same height (z=0). The eyes are assumed to be separated by 0.06 m, making the coordinates of the left and right eyes $E_L$=(−0.03 m, 0, 0) and $E_R$=(0.03 m, 0, 0), respectively. With this initial setup, when the viewer looks at the front object O2 in the center column, the rectilinear grid spans ±27° of the viewer's horizontal visual field. If the viewer looks at the left (O1) or right (O3) object in the front row, the grid spans from 0 to 54° or 0 to −54°, respectively. Since there is no elevation difference among objects and eyes, the 3D depth computation is a problem in plane geometry, where the VE of an object depends only on a value along the horizontal axis.

With the configuration in FIG. 2, the VE of an object $O_i$ projected to the left and right eye retinas while fixating on an object ($O_F$) can be computed simply by subtracting the angle to the fixated object from the angle to the object. The following equations compute VEs and resulting ADs for objects in FIG. 2:

$$VE_{L,i} = \operatorname{atan}\left(\frac{O_{i,x} - E_{L,x}}{O_{i,y} - E_{L,y}}\right) - \operatorname{atan}\left(\frac{O_{F,x} - E_{L,x}}{O_{F,y} - E_{L,y}}\right) \quad (1)$$

$$VE_{F,i} = \operatorname{atan}\left(\frac{O_{i,x} - E_{H,x}}{O_{i,y} - E_{H,y}}\right) - \operatorname{atan}\left(\frac{O_{F,x} - E_{H,x}}{O_{F,y} - E_{H,y}}\right) \quad (2)$$

$$AD_i = VE_{L,i} - VE_{F,i} \quad (3)$$

where $VE_{L,i}$, $VE_{R,i}$ are visual eccentricities of object i, as seen in the left and right eye, respectively, $O_{F,x}$, $O_{F,y}$, $O_{i,x}$, $O_{i,y}$ are the x- and y-coordinates of the fixated object OF and object $O_i$, and $E_{L,x}$, $E_{L,y}$, $E_{R,x}$, $E_{R,y}$ are the x- and y-coordinates of left and right eye nodal points.

For simplicity and clarity, it is assumed that the distance between the nodal points remains fixed with eye rotations and equal to the IPD, as it is the nodal point locations that are the origin of visual eccentricity measurements. The magnitude of nodal point offsets with eye rotations and the distances to the objects of interest affects VE by less than 0.1°, and it affects AD by an order of magnitude less, which is considerably smaller than the AD effects on the order of 1° that will be discussed in more detail below.

FIGS. 3A-3C are plots showing angular disparity (AD), egocentric (i.e., actual) distance, and depth for objects O1-O9 in FIG. 2 as a function of lateral position, as perceived by eyes $E_L$ and $E_R$. FIG. 3A shows the ADs of the nine objects in the real scene, as projected to a viewer's retina while fixating at the center object (O5). The fixated object (O5) has zero AD, nearer objects (e.g., O1-O2-O3) relative to the fixated object have positive ADs, and farther objects (e.g., O7-O8-O9) have negative ADs. Therefore, ADs in binocular vision can be considered as an encoding of depth structure in 'relative' (not 'absolute') distance/depth with respect to the egocentric distance to the fixated object. Along a given line of sight, disparity monotonically decreases with distance, but the scale of the change and the location of zero disparity vary as a function of VE. This suggests that in order to estimate the absolute or actual egocentric distance to an object in the visual field, the human binocular vision system must combine at least two different depth cues, one based on the binocular stereo cues (e.g., AD) that supplies relative spatial layout of the visual scene, and the other based on non-disparity based visual depth/distance cues (e.g., known size of the aimed object, convergence angle, accommodation, and/or linear perspective) that provide an estimate of absolute distance to the fixated object. The effectiveness of the various depth cues depends primarily on distance from the viewer to the objects of interest, and combinations among various depth cues are situation dependent.

Comparing the AD distribution (FIG. 3A) to the egocentric distance distribution of the objects (FIG. 3B), it is evident that the objects along the line of sight (0° VE, O2-O5-O8) have larger AD differences than the off-center objects (O1-O4-O7 and O3-O6-O9). Moreover, among the objects on the same line in depth, the nearer objects (O2-O5) show larger AD differences than the distant objects (O5-O8) for the same depth difference (1 m). This means that for a viewer to perceive egocentric distance correctly, the AD information acquired by binocular vision has to undergo a non-linear conversion process (e.g., conversion of FIG. 3A to FIG. 3B). Equation (4) applies such conversion to the egocentric distance in the physical world from the disparity and eccentricity information of an object in the viewer's visual scene:

$$D_i = d^*[\cos(\theta_i)\cot(\omega_i) + \sqrt{1 + \cos^2(\theta_i)\cot^2(\omega_i)}] \quad (4)$$

where $D_i$ is the egocentric distance from the viewer to an object i (e.g., $O_i$), d is the distance between nodal points of left and right eyes (i.e., the inter pupillary distance (IPD)), $\theta_i$ is the VE of the object i, relative to the gaze (fixation) direction taken from the origin (O), and $\omega_i$ is the AD of the object i.

Once the perceived egocentric distance is computed, it undergoes another non-linear conversion that finalizes the natural perception of depth, which is a perceptual judgment that objects on the same frontoparallel depth plane in the physical world are perceived to be at the same depth (e.g., conversion of FIG. 3B to FIG. 3C). For example, referring to FIG. 2, the viewer should perceive objects on the same row (e.g., O1-O2-O3, O4-O5-O6, and O7-O8-O9) to be aligned on the same frontoparallel plane. Equation (5) maps the egocentric distance and VE to the object position in the physical world. The mapping of an off-fovea object only depends on perceived distance and the corresponding VE:

$$P_i = D_i \cos(\theta_i) + \left(\frac{D_{Fixated} - D_i \cos(\theta_i)}{\cos(\theta_i)}\right) \quad (5)$$

where $P_i$ is the perceived depth to the object (distance from the origin O to the frontoparallel plane containing the object) and $D_{Fixated}$ is the egocentric distance from the viewer to the fixated object (e.g., O5). Equations (1)-(5) represent a mathematical model of the series of geometric conversions that occur to perceive the correct depth configuration of the sample scene in FIG. 2 from the left and right eye VEs of non-fixated objects.

Perception of 3D shape and slant are largely unaffected by various (static) perspective conditions and maintain perceived stability of the scene structure. First, to examine the stability of the AD structure across eye movements, VEs and ADs of objects in the arrangement of FIG. 2 were computed while assuming that the viewer's head position remains in the center of the world (i.e., at the origin O) as the eyes fixate different objects in the grid. FIGS. 4A-4C are graphs of AD as a function of VE for each of the objects O1-O9 while the viewer's gaze was fixated on O1 (FIG. 4A), O5 (FIG. 4B), and O9 (FIG. 4C). Linear perspective projection was applied to the spatial configuration, so the plots show the VE and AD of each object as seen by the viewer. The vertical axis in FIGS. 4A-4C represents AD in degrees, with negative values representing uncrossed disparities. Depth increases as disparity decreases monotonically. Positive/negative disparity and crossed/uncrossed disparity are often mixed in use. While in this disclosure positive disparity means a closer object (and in graphics/image processing literature as well), crossed disparity means a closer object in optometric/clinical literature. Zero disparity, however, does not generally imply that an object is at the same egocentric distance as fixation, unless the object and fixation are the same angle from the midline.

If a viewer makes a series of the eye movements from O1 to O5 then O9 (e.g., FIG. 4A→4B→FIG. 4C, respectively), it is evident that although the AD of each object changes based on which object is fixated, the AD structure (the shape of disparity plots), which defines relative disparities among objects, is preserved across the eye movements. Therefore, it can be concluded that the viewer's eye movements do not disrupt the perception of the stable (rigid) visual world in natural stereo viewing.

Since the extraocular muscles' proprioception of vergence angle (along with accommodation) provides a relatively inaccurate estimate of absolute egocentric distance to the fixated object, estimating absolute distance to an object relies on non-physiological, but somewhat less reliable, information, such as the known size of the object and size ratios of objects. Therefore, estimating absolute distance should be relied upon only when it is clearly needed. This supports the primacy of relative disparity over absolute disparity for visual perception of the 3D world, to eliminate the convergence/accommodation conflict of stereoscopic displays.

Figure 5C:
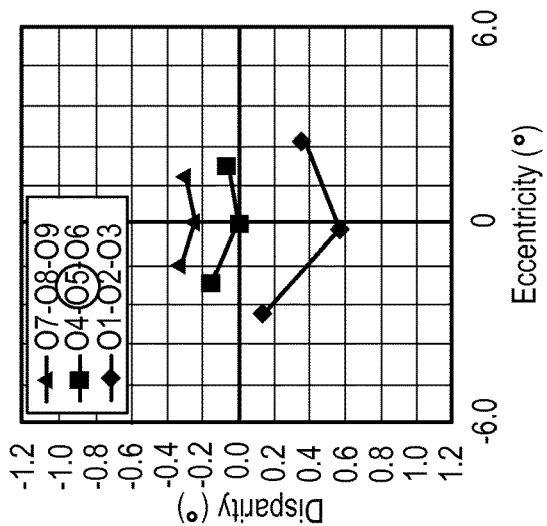
FIG. 5C is a graph of angular disparity as a function of eccentricity for each of the nine objects of FIG. 2, with the left and right eyes fixated on the center object, and the viewer's head positioned right of the coordinate origin.
Figure 5B:
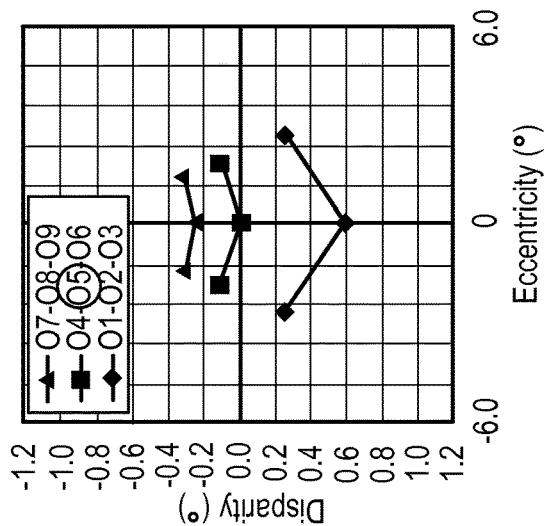
FIG. 5B is a graph of angular disparity as a function of eccentricity for each of the nine objects of FIG. 2, with the left and right eyes fixated on the center object, and the viewer's head positioned at the coordinate origin.
Figure 5A:
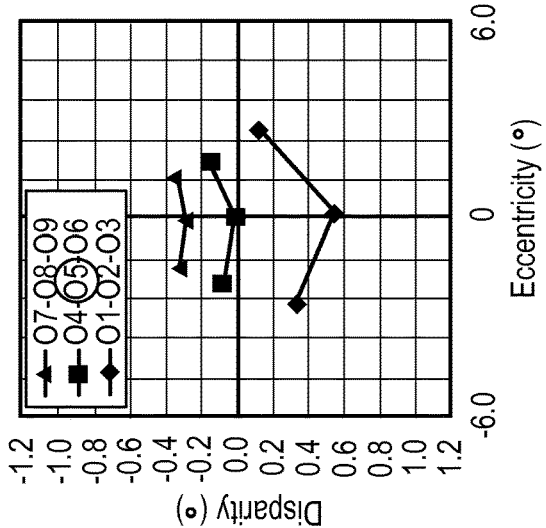
FIG. 5A is a graph of angular disparity as a function of eccentricity for each of the nine objects of FIG. 2, with the left and right eyes fixated on the center object, and the viewer's head positioned left of the coordinate origin.

To determine if analogous perceptual stability is maintained across viewer's head position changes during natural stereo viewing—which is particularly important because head motion is accompanied by corresponding vestibular motion signals and motion parallax—the AD structures for the scene in FIG. 2 were computed with the viewer's head at different positions. In particular, FIGS. 5A-5C are graphs showing AD as a function of VE while the viewer is fixated on the center object O5, with the viewer's head located at −0.2 m (FIG. 5A), 0 m (FIG. 5B), and +0.2 m (FIG. 5C) from the coordinate origin.

It can be seen that the AD structure of the scene rotates as a consequence of the shifted head position to reflect perspective rotations. For example, if a viewer is fixating at the center of the grid object (O5), and makes a horizontal head shift from left to right (FIG. 5A→FIG. 5B→FIG. 5C), ADs of those objects on the left side of the visual field are decreased and the ADs of objects on the right side are increased. Therefore, the viewer will perceive the spatial structure in the sample world rotating clockwise with a center of rotation at the fixated object (O5). Although it is difficult to say that the structural rigidity will be maintained during these rotations from the disparity-eccentricity relationship alone, perceptual rigidity is maintained under these conditions, perhaps with help from other visual cues like motion parallax or perspective projection.

If a viewer makes a series of head position changes, vestibular signals, as well as other sensorimotor systems, signal the shift of the self-position in the same direction. At the same time, the head shifts cause a series of view changes in the opposite direction. However, since the viewer is aware that self-motion is causing the perspective changes, he/she counterbalances the visual rotation signal and maintains a perception that the world is stable. A shift of perception from object-motion to self-motion, based on additional sensory evidence of self-stability, has been demonstrated with vibration-induced eye movements. The foregoing analysis also supports the binocular depth perception hypothesis, which provided results similar to those shown here, and concluded that the perceptual stability of a 3D scene under head and eye movements relies on classes of disparity changes that are invariant with self-motion.

The integration of information regarding self-motion/object-motion is not limited to low-level sensory cues (e.g., binocular disparity, muscle motion, vestibular stimulation, auditory signals), and the cues must be consistent with high-level rules of perception. For example, the angular size of objects should follow the change of egocentric distance, and a new view, which was not visible (occluded) before, should be acquired as viewing perspective changes. If visual information on self-motion/object-motion is not internally consistent, the conflicting signals may provoke motion sickness. FIGS. 4A-4C and 5A-5C indicate that stereo disparity-based observations in the real world are free from such conflicts.

Stereoscopic Image Capture

In general, in stereoscopic 3D imaging, two images of a scene—representing two different viewpoints—are obtained or created, and then delivered to a viewer. To generate two different views, two cameras (in real-world video) or two viewpoints (in computer graphics) are typically used to capture/render corresponding left and right eyes scenes. Whether it is real-world image capture or computer rendering, there are two common scene capturing configurations: one with vergence (converged-axes or 'toe-in' stereoscopic imaging) and the other without vergence (parallel-axis stereoscopic imaging).

Figure 6B:
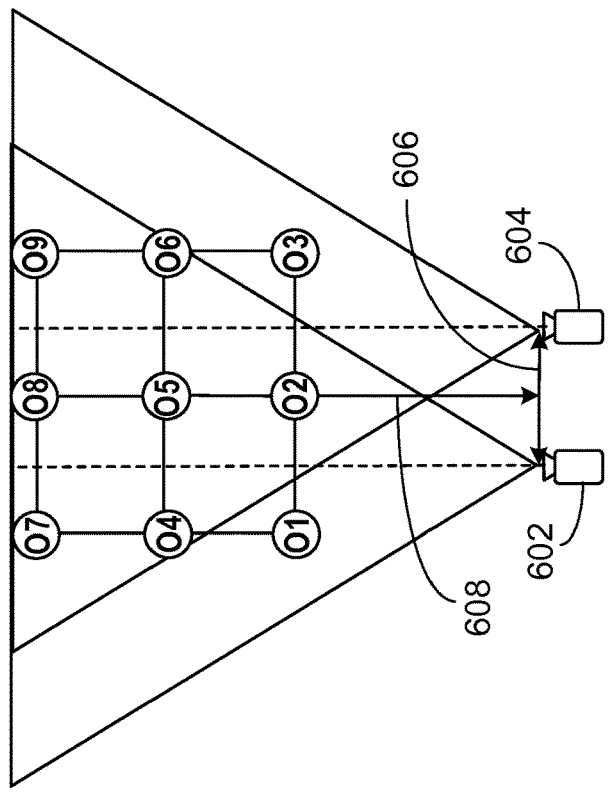
FIG. 6B is a schematic diagram showing stereo image capture without vergence.
Figure 6A:
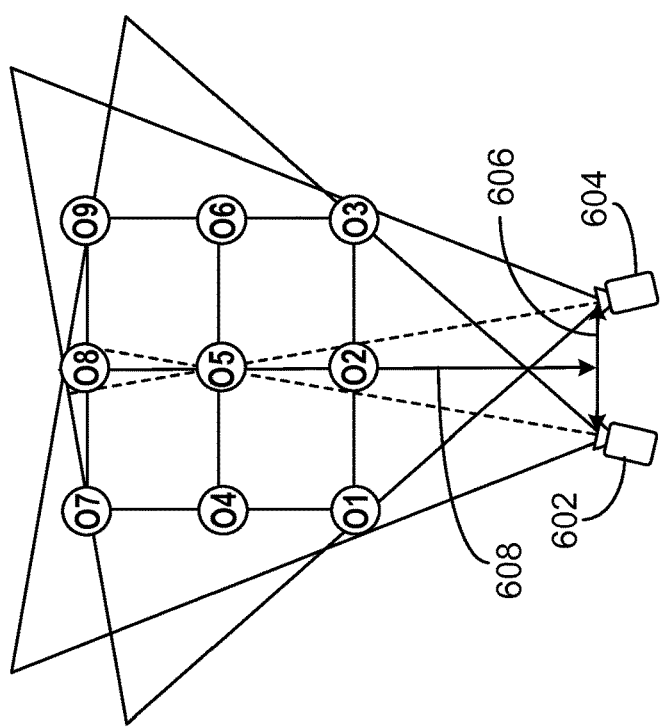
FIG. 6A is a schematic diagram showing stereo image capture with vergence.

FIGS. 6A and 6B are schematic diagrams showing image capture with vergence (FIG. 6A) and without vergence (FIG. 6B), using two cameras 602 and 604. In each of the figures, the distance between the two cameras 606 is 0.06 m, objects O1-O9 are placed on a grid with 1 m spacing between adjacent grid points, and the distance 608 to the first row of the grid from the camera/viewpoint plane is 2 m, as in FIG. 2.

When the camera/viewpoint simulates a viewer fixating at center object O5, if the stereo scene is captured with vergence (FIG. 6A), the center object is already aligned at the center of the captured images on both cameras. In this case, no additional scene alignment is needed, but it is necessary to rotate the image planes when the captured scene is projected to the screens in order to replicate the angular relationships in the physical scene between the objects and the cameras' planes. Such tilt can be difficult to implement in projection or single monitor stereo display systems. A 'lens tilt' design, wherein lens and sensor are independently rotated inside the camera hardware, may be used to match the geometry of the capture plane to the display geometry, but the utility of the lens-tilting method is limited, because the tilted lens causes blur. In dual display stereo systems such as HMDs and Wheatstone (i.e., mirror-based) stereoscopes, the display systems can be tilted to match the capture system's geometry.

If the stereo scene is captured without vergence simulation (FIG. 6B), the fixated center object, O5, is captured right of center in the left camera, and left of center in the right camera. Therefore, the fixated object in the captured images needs to be shifted towards the center of the screen (left image shifted left; right image shifted right) to eliminate the incorrect (non-zero) VE of the target object. The image shift problem can also be addressed during image acquisition by employing a "shift sensor" design in which the sensor is horizontally shifted (relative to the camera lens) during capture to center the target object on the sensor.

Since capturing a scene with vergence mimics the extra ocular motor control of the human binocular vision system (compare FIG. 1 and FIG. 6A), the VEs and ADs of the objects in the visual field are naturally preserved in the captured 2D image space. If the captured images are properly projected to viewer's retinas, they should provide the viewer the same disparity configuration (AD-VE relationships) as the real scene, and maintain stable disparity structure throughout camera movements, such as panning and tracking, as observed with natural human binocular vision, illustrated in FIGS. 4A-4C and 5A-5C. However, as mentioned above, the projection angles of the images have to be matched with the vergence angle of the cameras, which can be challenging to implement in most commercial display systems. Without such matching unnatural depth distortion with horizontal motion results, as will be discussed in greater detail below.

When a scene is captured without vergence, both cameras are aimed parallel to the cyclopean line of sight that connects the midpoint between the cameras and the target object (FIG. 6B). The VEs of other objects while aiming at one object can be computed by subtracting the angle of the cyclopean view (origin to object) from the angle of the camera view (center of camera to object). The AD of the object is, again, the angular difference between VEs captured by the left and right cameras.

Figure 7C:
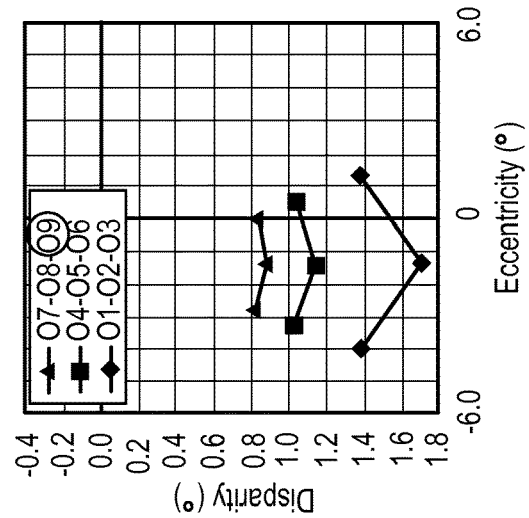
FIG. 7C is a graph of angular disparity as a function of eccentricity for each of the nine objects of FIG. 2, with two cameras focused on an object in the third row.
Figure 7B:
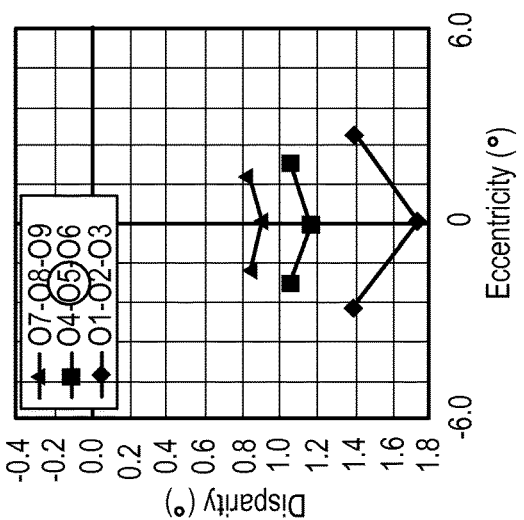
FIG. 7B is a graph of angular disparity as a function of eccentricity for each of the nine objects of FIG. 2, with two cameras focused on an object in the second row.
Figure 7A:
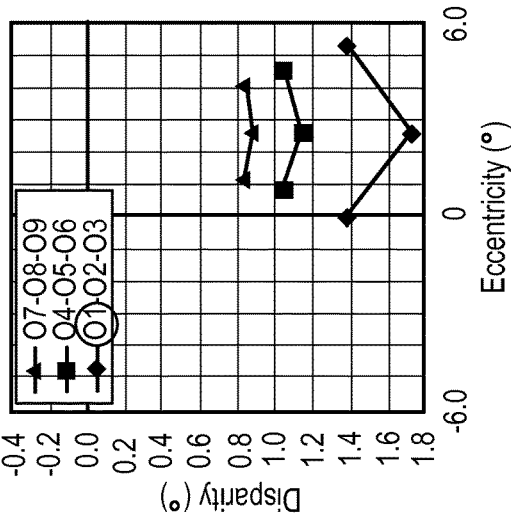
FIG. 7A is a graph of angular disparity as a function of eccentricity for each of the nine objects of FIG. 2, with two cameras focused on an object in the first row.

FIGS. 7A-7C are graphs showing captured AD distributions as a function of VE when the camera aims at objects in different rows and columns (aiming at O1 in FIG. 7A, O5 in FIG. 7B, and O9 in FIG. 7C). Although the VEs of objects vary depending on the object at which the camera is aimed, the ADs of all objects do not change with camera rotations (ignoring the slight distance shifts of yoked rather than individually rotated cameras). For example, the VE of the object O5 changes from 26° to 0°, then to −14° as the aim of camera changes from O1 to O5 to O9, but the AD of O5 is kept constant (1.18°) throughout the aiming changes. Therefore, this capturing method produces absolute AD information of objects in the scene (or the relative AD information with respect to an object at infinite distance).

For the human visual system (as well as for camera capture with vergence), other objects' ADs are normalized with respect to the fixated object's zero AD. This effectively limits the range of ADs required for binocular fusion around the attended distance. However, when capturing without vergence, the AD of objects at an infinite distance becomes zero, and the AD increases for objects located closer to the camera. Therefore, an object close to the camera may have a relatively large AD, so large that it may be too large for binocular fusion. For example, the objects on the nearest row (O1-O2-O3) which are around 2 m away from the cameras have ADs larger than 1.4°.

The AD threshold for human binocular fusion depends on several factors, including exposure duration, size, and eccentricity of the stimulus, but it is generally accepted that ADs less than 0.5° can be fused easily and quickly, while ADs as large as 1° can be fused with the help of motor vergence and longer exposure time. Therefore, for the purpose of stereo displays, the common binocular fusion AD is kept to less than 1°. If an object's AD is larger than 1°, fusion can fail and it may be seen as diplopic. In FIG. 2, when captured without vergence, objects on the first (O1-O2-O3) and likely the second (O4-O5-O6) row will be perceived as doubled.

To avoid the problem of fusing large ADs, horizontal image translation (HIT) is commonly applied so that the aimed object captured by each camera is shifted to the center of the dichoptic images after the capture process. The amount of shift required during HIT depends on the distance to the aimed object, with larger shifts needed for closer objects. The original images should also be wide enough to preserve the desired display size after being cropped to exclude portions available from just one camera. Therefore, applying HIT with motion picture videos is generally followed by cropping and re-sampling of the images, so that the cropped image size remains constant. Although HIT is designed to preserve natural AD structure, the amount of shift is often retained as an artistic decision to be made during the post-production process, which affects the overall (absolute) depth effects of the scene.

Figure 8C:
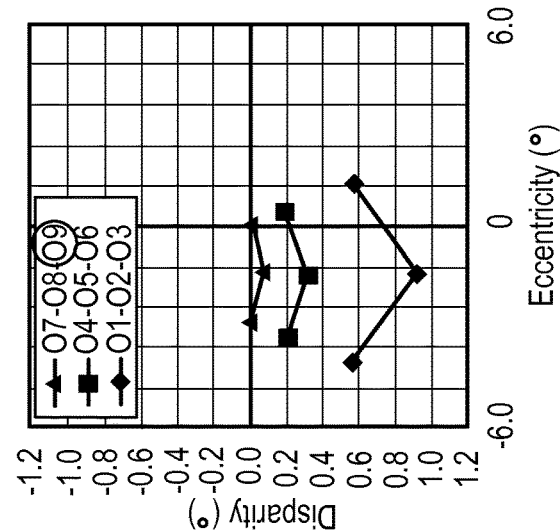
FIG. 8C is a graph of angular disparity as a function of eccentricity for each of the nine objects of FIG. 2, with two cameras focused on an object in the third row, and following horizontal image translation.
Figure 8B:
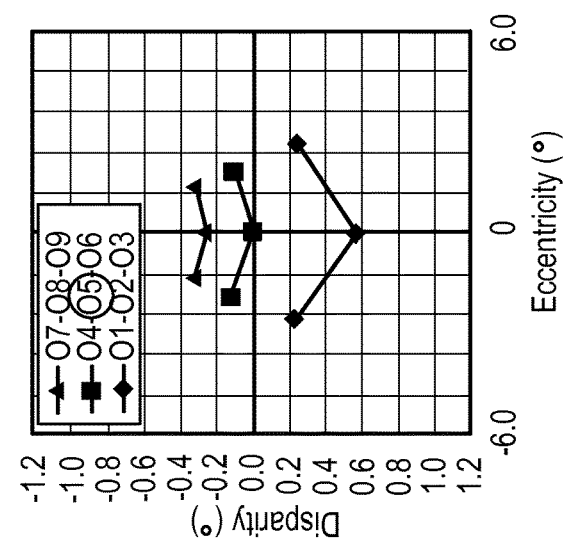
FIG. 8B is a graph of angular disparity as a function of eccentricity for each of the nine objects of FIG. 2, with two cameras focused on an object in the second row, and following horizontal image translation.
Figure 8A:
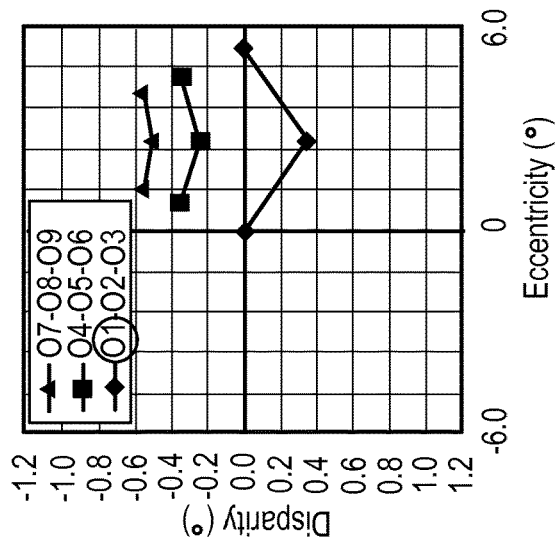
FIG. 8A is a graph of angular disparity as a function of eccentricity for each of the nine objects of FIG. 2, with two cameras focused on an object in the first row, and following horizontal image translation.

Once the aimed object images are aligned, the VEs and egocentric distance of other objects can be computed with the functions given in Equations (1)-(3). FIGS. 8A-8C are graphs showing the resulting AD distribution after HIT as a function of VE, with cameras aimed at different objects in the scene of FIG. 2 (i.e., cameras aimed at O1 in FIG. 8A, at O5 in FIG. 8B, and at O9 in FIG. 8C). The projection screen is 3 m away (the physical distance to the center of the object grid) in FIGS. 8A-8C. Since HIT is a linear (not angular) transformation, this process inevitably also alters relative AD information. However, the amount of AD distortion is too small to be perceptible (less than 0.00001° AD distortion for the large VE objects).

Comparing the pre-HIT disparity distributions (FIGS. 7A-7C) with post-HIT disparity distributions (FIGS. 8A-8C) reveals that the HIT effectively reduces the maximum disparity to a manageable level (less than 1°), and restores the proper behavior of the (relative) disparity structure, where the aimed object's disparity is zero throughout aiming changes, just as was shown for human binocular fixation changes. While slight VE differences can be noted when comparing the results of FIGS. 8A-8C with those of FIGS. 4A-4C, the AD differences are indeed negligible.

Perception of Motion in Depth in Projected Stereoscopic Imagery

Regardless of which capture method is used, captured stereoscopic images (pairs of left and right camera/viewpoint perspectives of a scene) are presented separately to viewer's left and right eyes using various methods, such as anaglyphs with red-cyan glasses, active shutter glasses with temporally alternating images, passive polarized glasses with polarized images, or autostereoscopy using lenticular arrays without any glasses. In most common stereoscopic video viewing systems, two images (left and right eye views) are displayed on a single screen, and a viewer watches from a fixed location. As will be discussed in more detail below, displaying the captured S3D images on a single surface affects binocular disparities and eventually causes perceptual depth distortion. When the two images are displayed on two different displays as in head mounted stereo displays, or in a mirror (Wheatstone) stereoscope, the two display planes have been always parallel (though they could be tilted), resulting in similar effects and distortions.

If the stereoscopic images are captured with vergence simulation (or captured without vergence simulation and then HIT post-processed), they maintain the disparity structure of the scene during camera aiming changes. In natural viewing, absolute disparity varies based on the physical distance to the aimed object, as shown in FIGS. 4A-4C. If the viewing position relative to the display or screen is synchronized with the actual distance to the aimed object, the whole 3D world should be perceived as if the viewer is looking at the scene from the camera position. However, it is difficult in practice to produce that sort of variable distance display or screen. Typically, the stereoscopic screen or display is located at fixed distance. If the distance between the viewer and the screen is shorter than the distance between the camera and the aimed object when the scene was recorded, overall disparity increases (both negative and positive), and the overall scene looks deeper than it should be. If the viewer's distance to the display/screen is larger than the capture distance, overall disparity will be reduced and the scene will be appear shallower in depth. However, this overall depth distortion is much easier to adapt to because relative angular disparities change globally, compared to the dynamic, spatially variable, depth distortion described below.

To examine how conventional projection of S3D image information introduces perceptual depth motion distortion, the set of S3D images captured (as in FIGS. 8A-8C) are assumed to be displayed dichoptically on a single plane that is located 3 m away from the viewer (the distance to the middle row of the scene). The viewer-perceived ADs can then be calculated based on onscreen position of the objects using Equations (1)-(3), assuming that the IPD of the viewer is the same as the camera separation (0.06 m).

Figure 9F:
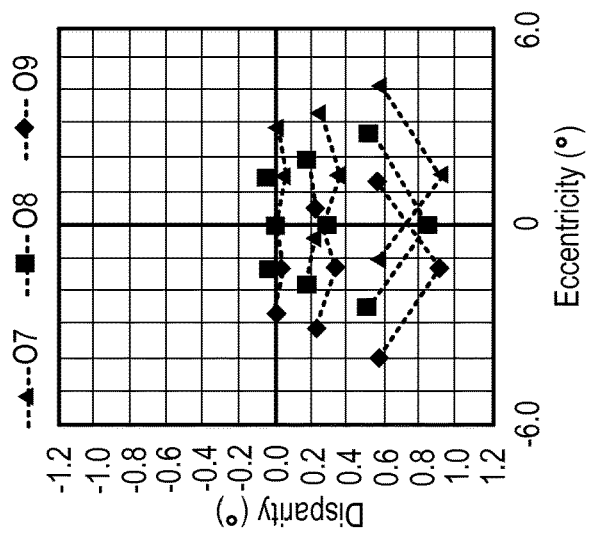
FIG. 9F is a graph of angular disparity as a function of eccentricity for natural viewing of all nine objects in FIG. 2, with gaze positions corresponding to each of the three objects in the third row.
Figure 9E:
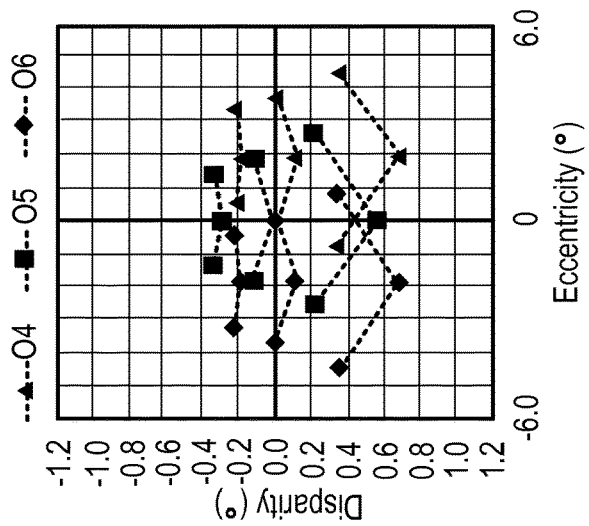
FIG. 9E is a graph of angular disparity as a function of eccentricity for natural viewing of all nine objects in FIG. 2, with gaze positions corresponding to each of the three objects in the second row.
Figure 9D:
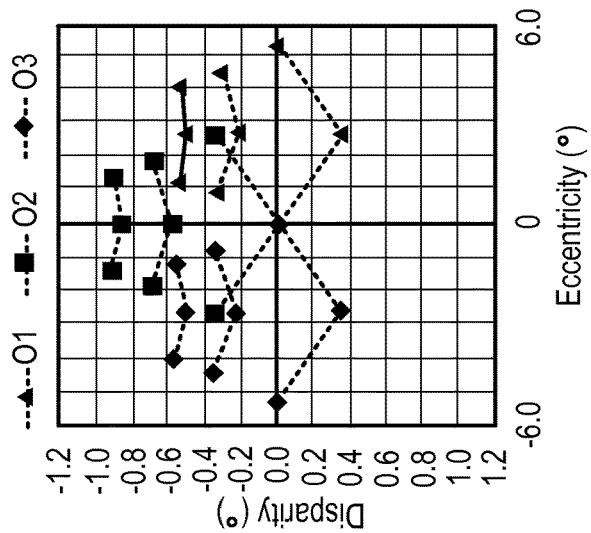
FIG. 9D is a graph of angular disparity as a function of eccentricity for natural viewing of all nine objects in FIG. 2, with gaze positions corresponding to each of the three objects in the first row.

FIGS. 9A-9C are graphs showing AD as a function of VE for all 9 objects O1-O9 in FIG. 2, for gaze positions in the first row of objects (FIG. 9A), the second row of objects (FIG. 9B), and the third row of objects (FIG. 9C). FIGS. 9D-9F are graphs showing corresponding ADs as a function of VE for natural viewing of the same scene. FIGS. 9G-9I are graphs showing the arithmetic difference between corresponding AD values in FIGS. 9A-9C and 9D-9F. That is, FIG. 9G corresponds to the arithmetic difference between AD values in FIGS. 9A and 9D, FIG. 9H corresponds to the arithmetic difference between AD values in FIGS. 9B and 9E, and FIG. 9I corresponds to the arithmetic difference between AD values in FIGS. 9C and 9F.

If no depth distortion is introduced in the scene capture and projection, the S3D ADs of FIGS. 9A-9C should have the same shape as those for the natural views of FIGS. 9D-9F. However, the S3D scene as perceived by the viewer shows substantial AD distortions (differences from natural viewing, as shown in FIGS. 9G-9I), which unavoidably introduce perceptual changes in apparent depth structure. Even though it is possible to achieve binocular fusion at most of the AD values, the magnitude of the depth distortion at higher eccentricities is substantial.

Comparing FIGS. 9A-9C to FIGS. 9D-9F reveals that the objects displayed at larger VEs get progressively larger ADs than they have in natural viewing. Therefore, the viewer will perceive objects shown at larger VEs to appear closer than they should be. Since the S3D images are displayed at a fixed distance (the distance between the camera and the middle row), FIGS. 9A-9C can also represents situations in which a viewer's viewing distance is farther (FIG. 9A), the same (FIG. 9B), and nearer (FIG. 9C) than the captured aiming distance. Still, it is apparent that the shape of the depth distortion is only slightly affected by aiming distance. This indicates that the source of the depth distortion is not directly related to the vergence change during the S3D capture process, but rather due to the rotation of the left and right image planes with respect to the projection screen.

For static S3D images, the impacts of these depth distortions are minimal, for several reasons. First, the brain perceives the structure in conjunction with undistorted 2D monocular depth cues such as linear perspective that serve to counteract the AD distortion. Second, large AD distortions occur at larger VEs (peripheral vision), where the depth perception accuracy is much lower. Third, the outer VE area gets less attention (even with 2D distortions) and static spatial distortion in the periphery can easily be unnoticed.

However, if there is motion in the scene (or motion of the camera), these disparity distortions continuously introduce changing depth motion distortions, and produce unnatural optic flow, which are non-existent in the real world. In the scene of FIG. 2, when a camera scans the scene horizontally (by panning and/or tracking during capture) from object O1 to object O2, and then to object O3 (FIG. 9A), the S3D viewer perceives unnatural and varying compression and expansion of the depth space. At the same time, perspective and object size cues indicate no depth change. For example, the viewer's perception of the depth structure will change as if the distance between objects in the left column (O1-O4-O7) is compressed then expanded, while the distance between objects in right column (O3-O6-O9) is expanded then compressed. This also affects the perceived thickness of objects or structures, conflicting with their known rigidity.

If the camera approaches or retreats to/from the objects at constant speed (FIGS. 9A to 9B to 9C), the objects at larger VEs will be perceived as if they are speeding up or down compared to the objects at central VE that maintain constant speed. In other words, the viewer perceives progressively faster depth motion at larger VEs which creates an illusion of elongation of rigid bodies in depth at larger VEs. These perceived changes in spatial depth create high level conflicts for what is expectedly a stable environment, e.g., the ground or rigid walls appearing to expand or contract during camera movements. Note that similar distortions will be produced when objects in the scene change their eccentricity due to their motions, even when the camera aiming is static.

While in the foregoing discussion the viewer's head position was assumed to be fixed and aligned with center of the projection screen, in reality a viewer's head position frequently changes due to posture adjustments or purposeful movements. A viewer's horizontal self-motion while looking at a fixed spot causes motion parallax that is perceived as relative rotation of the depth structure in the opposite direction. For example, if a viewer, watching a static real-world 3D scene, moves rightward, the viewer sees a relative clockwise-rotated view of the scene. The rotational speed of objects is governed by linear perspective rules, so the near objects move faster and the farther objects move more slowly.

Figure 10C:
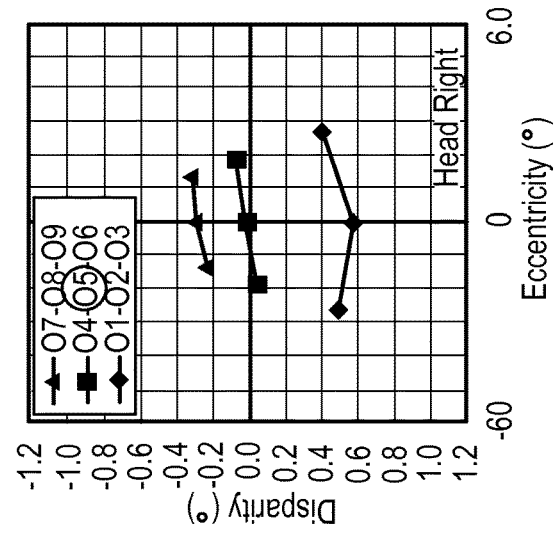
FIG. 10C is a graph of angular disparity as a function of eccentricity for each of the objects of FIG. 2 in a stereoscopic image, with the viewer's gaze fixated on the center object, and the viewer's head positioned right of the coordinate origin.
Figure 10B:
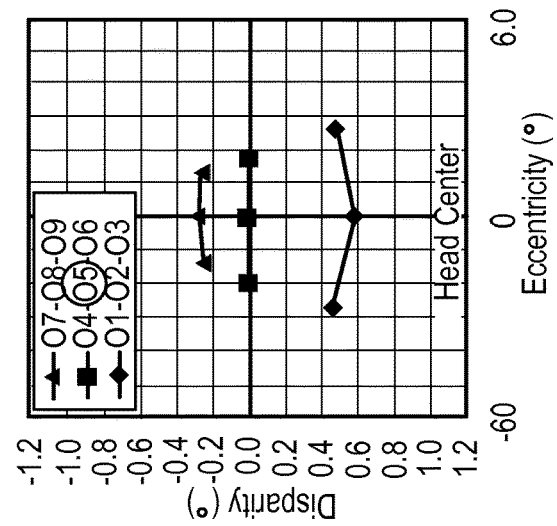
FIG. 10B is a graph of angular disparity as a function of eccentricity for each of the objects of FIG. 2 in a stereoscopic image, with the viewer's gaze fixated on the center object, and the viewer's head positioned at the coordinate origin.
Figure 10A:
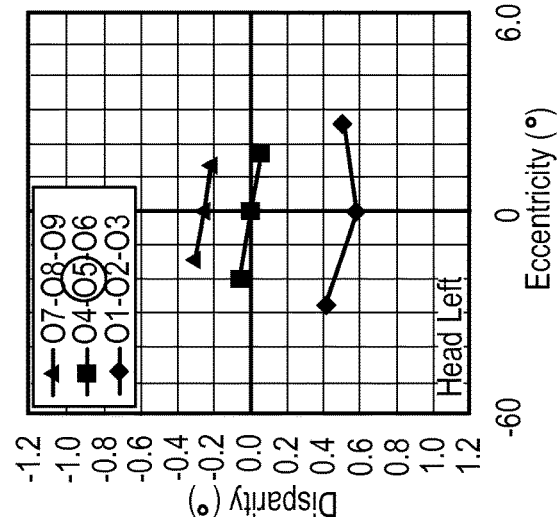
FIG. 10A is a graph of angular disparity as a function of eccentricity for each of the objects of FIG. 2 in a stereoscopic image, with the viewer's gaze fixated on the center object, and the viewer's head positioned left of the coordinate origin.
Figure 10F:
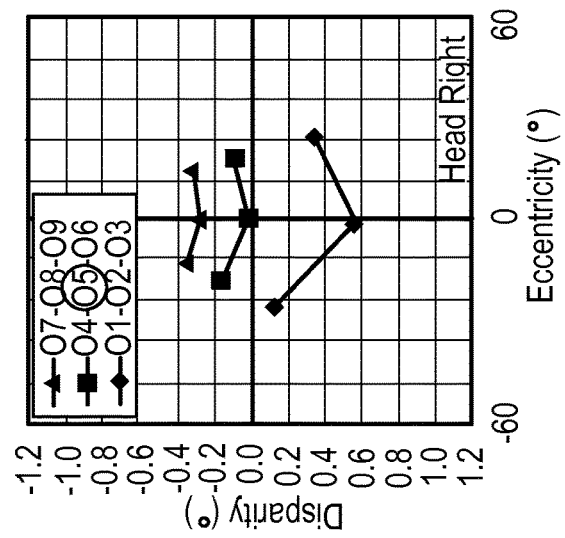
FIG. 10F is a graph of angular disparity as a function of eccentricity for each of the objects of FIG. 2, viewed naturally with the viewer's gaze fixated on the center object, and the viewer's head positioned right of the coordinate origin.
Figure 10E:
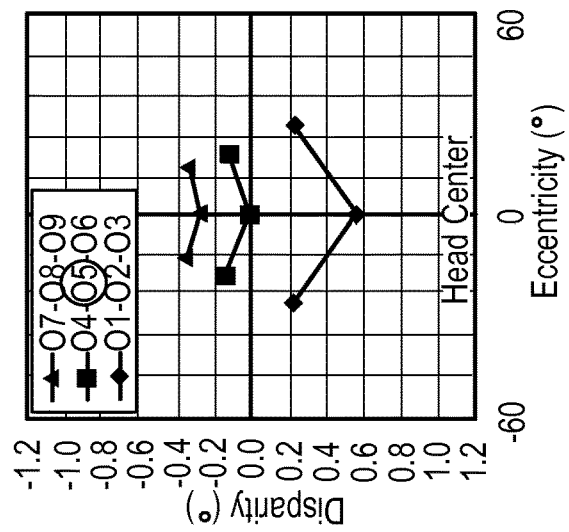
FIG. 10E is a graph of angular disparity as a function of eccentricity for each of the objects of FIG. 2, viewed naturally with the viewer's gaze fixated on the center object, and the viewer's head positioned at the coordinate origin.
Figure 10D:
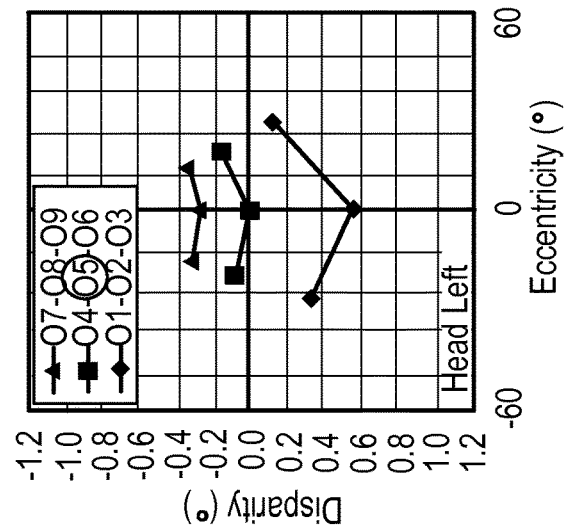
FIG. 10D is a graph of angular disparity as a function of eccentricity for each of the objects of FIG. 2, viewed naturally with the viewer's gazed fixated on the center object, and the viewer's head positioned left of the coordinate origin.

FIGS. 10A-C are plots showing perceived AD distribution of the displayed stereoscopic images as a function of VE, with the viewer's head position at 0.2 m left (FIG. 10A), 0.0 m (FIG. 10B), and 0.2 m right (FIG. 10C) from the center. Viewing distance is 3 m. Corresponding AD distributions for real-world viewing conditions are shown in FIGS. 10D-10F.

When viewing the S3D scene, if the viewer makes head shifts from the left (FIG. 10A) to the center (FIG. 10B), and then to right (FIG. 10C), the AD distribution change indicates that the viewer will perceive the objects on the left side (O1-O4-O7) to be moving closer to the viewer, and the objects in the right (O3-O6-O9) moving farther away. Therefore, the viewer will perceive the whole AD structure as turning counter-clockwise. With natural stereo viewing, as shown in FIGS. 10D-10F, the perceived direction of objects' rotation in depth is reversed, and the depth structure appears to rotate clockwise relative to the viewer. The amounts of head shift shown in FIGS. 10D-10F are exactly the same as in FIGS. 10A-10C, but due to the depth motion distortion in the periphery, the reversed rotation of the scene will be relatively exaggerated.

It is also evident that the VE values of the center column objects (O2-O5-O8) during S3D viewing (FIGS. 10A-10C) are kept almost constant, even when the viewer's head position is shifted. However, in natural stereo viewing (FIGS. 10D-10F) the VE values of the center column objects are shifted slightly off-center; O2 moves left and O8 moves right when the viewer's head moves left, and O2 moves right and O8 moves left when the viewer's head moves right. At the center head position, O2 would block the view of O5 and O8, while all three would be visible with head shifts in natural stereo viewing. With S3D, they remain aligned with zero AD, so the perception is that they have rotated to maintain that alignment as the head is shifted (O2 would block the view of O5 and O8, regardless of head position).

The combined effect of these perceptual changes in ADs and VE in response to the viewer's head movements induces a perceptual illusion that the whole depth structure is rotating, with the center of rotation at the display (zero disparity) plane. However, during natural stereo viewing, if a viewer's head position changes while looking at an object, the perceived center of rotation is at the position of the gazed object. FIGS. 10G-10H are schematic diagrams showing the perceived depth axis rotation as the head of the viewer moves left and right, respectively, when viewing S3D images. FIG. 10I is a schematic diagram showing the perceived stable view of the scene, even with left and right head movements, during natural viewing.

Thus, when a viewer's head moves laterally when viewing S3D, several perceptual motion conflicts may rise and lead to motion sickness. First, due to the AD distortion between left and right sides of the visual fields, the viewer is presented with unequal compression/expansion of the space, left and right of fixated objects. This can make a seemingly rigid depth structure appear to be deformed. Second, the natural motion parallax rule is violated, as objects positioned closer to the viewer from the fixated object fail to move faster than the farther objects in a direction opposite the head motion. The illusion of depth structure rotation is centered at the display plane (not necessarily at the fixated object) and all visible objects move at the same angular speed regardless of their distance, and they move in the same direction as the head motion, not opposite. This causes a dramatic illusion that the presumably stable world imaged in S3D is rotating in a direction that follows the viewer's head position. Although the human vision system can compensate for an incorrect viewing angle up to 30° with 2D pictures and still maintain perceptual invariance, compensating for the 3D display distortions associated with changes in viewing position becomes much more complex due to the dynamic 3D distortion explained above.

In addition to this low level perceptual effect, there is also a high level perceptual motion conflict. The translational motion of the viewer from one side to another under natural conditions is always accompanied by corresponding view changes that expose new aspects of an object (dynamic disclosure) and occlude others (dynamic occlusion). This view change is not limited to the view of a single object. It extends to the visibility of foreground-background depth relations (visual parallax). However, since the S3D scene as displayed and perceived by the viewer has only one view (the camera viewpoint), a viewer's head movements do not provide the expected visual parallax changes (absence of multi view and dynamic occlusion and disclosure). The lack of changing perspective in spite of the physiological sensation of head motion makes it easier for viewer's brain to interpret the view-following illusion as a result of the objects moving to track the viewer's head movements. This is similar to the rotational illusions seen with the hollow-face illusion and Patrick Hughes's reverspective drawings.

As discussed above in connection with FIGS. 4A-4C and 5A-5C, the viewer's eye movements do not affect the relative angular disparity (AD) during natural viewing of a 3D (real-world) scene. It is evident that although the absolute ADs do change with changes in the viewer's fixation point, the relative AD relationships among objects are maintained throughout the viewer's gaze movements. The perceived depth structure in real-world scenes does appear to be stable, supporting the primacy of relative depth for perception in stereo displays. This notion of a stable visual world is a key to maintaining body position and make judgments about self and external motions.

However, regardless of which video capture method (converging or parallel) is used, depth distortions exist in conventional S3D display configurations, and can be computed as AD differences between what would be perceived in the real world and what is perceived from the projected S3D images (e.g., shown as the curved lines in FIGS. 9G-9I). If the projected scene is stationary, the impact of depth distortions may be minimal. However, if the scene contains any kind of motion, whether it is caused by camera motion (panning/tracking) or object motion that moves the objects to different visual eccentricities, complex interactions of depth expansion and compression make the motions in the displayed S3D scene appear unnatural, where the local and global motions (e.g., peripheral vs. central vision) are in conflict.

In real-world conditions, perceived depth changes of structured objects naturally accompany changes in retinal size, but the relative ADs will be kept consistent, even with eye movements. However, if motion of the camera viewpoint is accompanied by spatial (depth) distortions that are unique for S3D viewing, the perception of relative distance among objects (in addition to the absolute distance to the viewer) in the S3D scene will break in an unexpected way (even for what should appear as a rigid body). Then the viewer will perceive compression or expansion in depth (depth wobbling) while other visual cues, such as perspective and size, show no depth change. These dynamic spatial distortions cause visual-to-visual cue conflicts, likely to be a cause of motion sickness reported with S3D movies.

Furthermore, in real-world viewing, when a viewer's head position is shifted laterally while fixating on an object, the depth structure appears to be rotated in the opposite direction of the viewer's head movement (FIGS. 10D-10F), but the perception of the depth structure remains stable because of the compensational vestibular signal that registers the ego-motion and counters the exo-motion. However, when the same scene is viewed in an S3D display (FIGS. 10A-10C and 10G-10I), the viewer's lateral position shift introduces a rotation of the depth structure centered at the display plane axis that follows the viewer's viewing angle toward the screen/display plane. As a result, it creates an illusion that the whole 3D depth structure appears to be rotating in the same direction as viewer's head movements (FIGS. 10G-10I). This rotation of the viewing angle may cause strong external artificial motion because the same amount of angular rotation is applied to the whole 3D depth structure, regardless of how far or close the real objects are located. This type of shift is inconsistent with the motion parallax experienced naturally.

The problem becomes more severe if other visual cues indicate that the scene is stationary. The motion parallax rules predict that closer objects make a large retinal slip and show more of the pre-occluded view of the object, and farther objects create a small retinal slip, so that they are perceived as a relatively stationary background per linear perspective rules. Since the S3D image only shows a single view from a particular viewpoint (the camera aiming direction) that is independent of the viewer's egocentric motions, the lateral changes of the viewer's viewpoint do not provide any additional view of the near objects. This creates an illusion of unnatural rotation, where the viewer's brain expects to see larger view changes of the near objects and the less retinal slip for the farther objects, but the whole scene appears to make no view changes and large retinal slips.

All of the visual conflicts mentioned above can be sources of the S3D-induced motion sickness. However, viewers may not easily adapt to those conflicts, because the amount and direction of the perceived 3D motion distortions change continuously as scene content changes. Further, it is hard to adapt to the randomness of the head movements that initiate motion parallax conflicts. Further still, the type of perceptual motion conflicts related to depth rarely exist when viewing naturally.

Studies of 3D visual field stimulation, which measures body sway amplitude when a subject is exposed to sinusoidal motion of a tunnel, have showed that postural stability is significantly more affected by the peripheral visual field (VE>7°) compared to central vision. Since most of the motion distortions due to spatial (depth) distortions in S3D image perception occur in the periphery, it can be expected that the impact of the depth motion distortion in the periphery is more severe than central distortions. Body sway amplitude measurements when subjects were exposed to a simulated dynamic visual distortion similar to that caused by progressive ophthalmic lenses have showed that the postural instability increases more when the stimulus moves laterally rather than vertically. Increased instability of the posture is an indication that vision-to-vision motion signal conflicts can disturb postural stability and may cause motion sickness.

Correcting Motion-Induced Distortions in Stereoscopic Imagery

Figure 11:
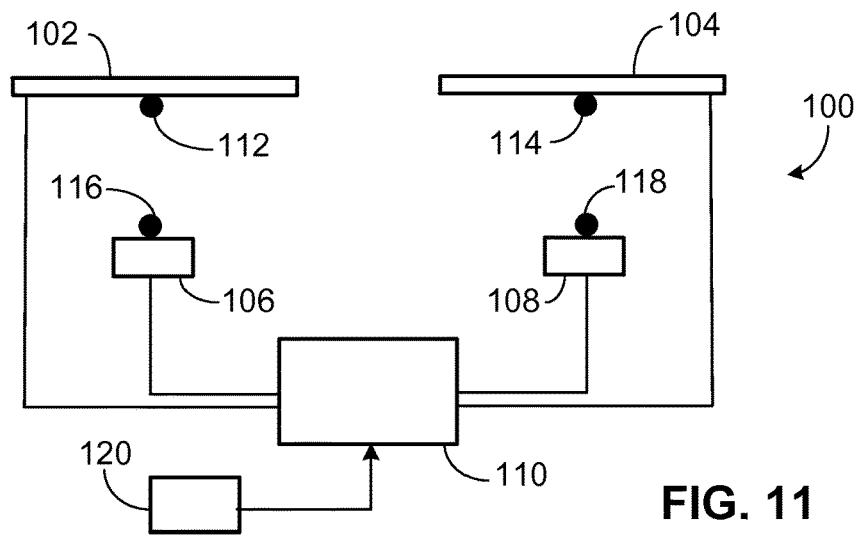
FIG. 11 is a schematic diagram of an embodiment of a stereoscopic imaging system.

FIG. 11 shows a schematic diagram of a S3D stereoscopic imaging system 100 that corrects for various motion-induced distortions. System 100 includes two projection screens 102 104 and two image capture devices 106 and 108. Each of these components is electrically connected to an electronic processor 110 that controls the operation of system 100.

While system 100 in FIG. 11 includes two projection screens and the following discussion references the two screens, it should be appreciated that in some embodiments, system 100 can include only a single projection screen, and the following discussion applies to such embodiments as well.

In general, the projection screens that are used in the systems disclosed herein can be movable or non-movable. For example, in some embodiments, projection screens 102 and 104 in FIG. 11 are fixed in position, relative to the eyes of a user of the system. As such, the system accounts for the fixed position of screens 102 and 104 when displaying images on the fixed screens, as will be discussed in further detail later, particularly when the angles at which the screens are viewed by the user do not necessarily correspond to the angles at which views of a scene are captured by image capture devices 106 and 108.

In some embodiments, projection screens 102 and 104 can optionally be rotated about pivot points 112 and 114, respectively, upon receipt of suitable control signals from processor 110. Rotation of screens 102 and 104 can be used to correct for perceived distortions in S3D images. For example, screens 102 and 104 can be rotated such that left and right view images—captured by devices 106 and 108, respectively—are projected by processor 110 onto two rotated projection planes that match with the vergence angles of devices 106 and 108 to maintain a correct perspective of the scene corresponding to the view images. Even when the vergence angles of devices 106 and 108 are changing (e.g., devices 106 and 108 are pivoting about points 116 and 118 under the control of processor 110 during image capture), screens 102 and 104 can be actively rotated to match the changing vergence angles of devices 106 and 108, thereby ensuring that the correct perspective is maintained in the projected images.

In some embodiments, the system can include a mixture of fixed (i.e., non-rotatable) and rotatable screens. For example, one of screens 102 and 104 can be rotated, while the other screen can be fixed in position. As discussed above, the systems disclosed herein can generally include one, two, and even more than two screens, and where the systems include multiple screens, the screens can include any combination of fixed and rotatable screens.

In certain embodiments, active rotation of a projection screen can be difficult to implement in real-time due to the relatively precise and rapid actuator control required to dynamically re-position a projection screen. Accordingly, image processing techniques can be used in addition to, or in place of, projection screen rotation to correct for perceived distortions in S3D images. That is, such processing techniques can be implemented in systems where screens 102 and 104 are fixed in position and do not rotate.

To address projection-related distortions, processor 110 can be configured to perform a scene-mapping procedure before the left and right S3D images are projected onto screens 102 and 104. The scene-mapping procedure ensures that each image is re-mapped onto a corresponding virtually rotated projection plane. The virtual rotation of the projection plane is selected by processor 110 based on the vergence angles of the left and right S3D images and the distance between the viewer and screens 102 and 104. The scene-mapping procedure is generally performed by processor 110 after processor 110 has corrected the S3D images for other optical distortions such as lens-related distortions (e.g., due to lenses in devices 106 and 108, and also due to lenses in a projector, if system 110 includes a projector for projecting the S3D images onto screens 102 and 104).

The scene-mapping procedure implemented by processor 110 bears some resemblance to methods that are commonly used to correct keystone distortion in stereo images. Keystone distortion is a two-dimensional geometric distortion where, for example, the left edge of an image captured by the left camera is longer than the right edge, and the right edge of an image captured by the right camera is longer than the left edge when the images are perceived. Keystone distortion is known to cause difficulty when fusing stereoscopic imagery and may induce additional eye strain.

Figure 12A:
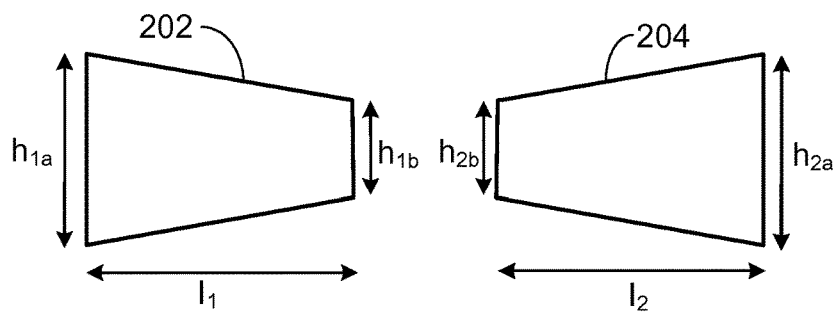
FIG. 12A is a schematic diagram showing left and right stereoscopic three-dimensional images with projection-related distortions.

To implement the scene-mapping procedure, processor 110 applies a scaling of height along the lateral dimensions of the S3D images captured by devices 106 and 108, so that in the re-mapped images, the edge heights in the left and right images are the same. FIG. 12A is a schematic diagram showing left and right S3D images 202 and 204, respectively. The left image 202 exhibits keystone-like distortion, with the height on the left edge, $h_{1a}$, larger than the height on the right edge, $h_{1b}$. Similarly, right image 204 exhibits keystone-like distortion, with the height on the right edge, $h_{2a}$, larger than the height on the left edge, $h_{2b}$.

Figure 12B:
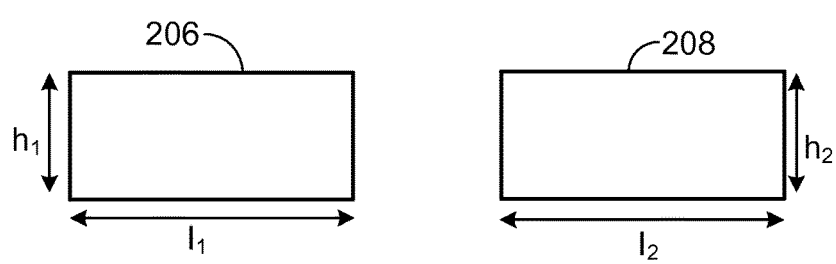
FIG. 12B is a schematic diagram showing the left and right stereoscopic three-dimensional images of FIG. 12A after scaling to correct for the projection-related distortions.

To correct images 202 and 204, processor 110 scales the height of the images along the lateral directions $l_1$ and $l_2$. FIG. 12B is a schematic diagram showing the left and right scaled images 206 and 208. In each of the scaled images, the heights $h_1$ and $h_2$ are the same along the lateral directions $l_1$ and $l_2$. Further, the heights $h_1$ and $h_2$ of the left and right scaled images 206 and 208 are the same (i.e., $h_1=h_2$) following the scene-mapping procedure.

The scaling of height that is applied along the lateral dimensions of the S3D images can in general be either a linear or non-linear scaling. As used herein, a linear scaling is an image transformation in which an image dimension is modified according to a mathematical function that varies according to the first power only of a variable. Referring to FIG. 12A, for example, in some embodiments the heights of images 202 and 204 can be scaled linearly according to a mathematical function that varies according to a first power of displacement along directions $l_1$ and $l_2$, respectively. As an example, the mathematical function for image 202 varies according to the first power of displacement along direction 11, with the function (and the height correction) having a value of zero at the right edge of image 202 (where the image height is $h_{1b}$), and a value of $(h_{1a}-h_{1b})$ at the left edge of image 202.

In certain embodiments, the scaling of height that is applied along the lateral dimensions of the S3D images can be non-linear. As used herein, a non-linear scaling is an image transforming in which an image dimension is modified according to a mathematical function that varies according to a variable in a manner that does not correspond only to the first power of the variable. Examples of non-linear mathematical functions include, but are not limited to, exponential functions, logarithmic functions, polynomial functions of order greater than or less than 1, fractional power functions, and combinations of any of the foregoing.

Referring again to FIG. 12A, in certain embodiments, the heights of images 202 and 204 can be scaled non-linearly according to a mathematical function that varies non-linearly with displacement along directions 11 and 12, respectively.

The foregoing scene-mapping procedure does not, in general, correct for angular disparity-related distortions, that is, distortions that arise due to the relative depths of different objects in S3D images. To correct for such distortions, in certain embodiments, processor 110 scales the width of the S3D images in the lateral direction such that the images appear rotated in virtual projection planes when they are displayed (e.g., projected).

Figure 13:
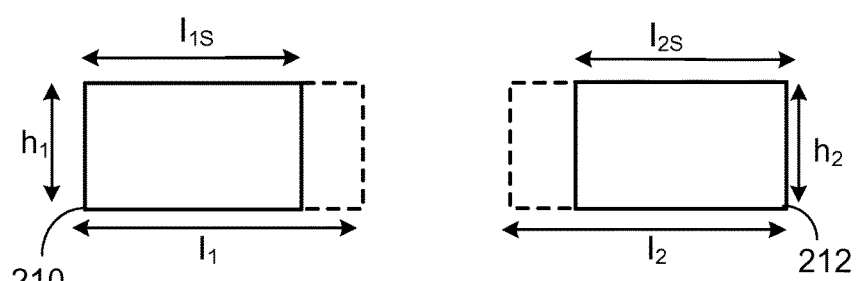
FIG. 13 is a schematic diagram showing scaling of the left and right stereoscopic three-dimensional images of FIG. 12B to correct for angular disparity-related distortions.

FIG. 13 is a schematic diagram showing left and right S3D images 210 and 212 that have been scaled by processor 110 in this manner. Starting with images 206 and 208 from FIG. 12B, processor 110 scales each image along lateral directions $l_1$ and $l_2$. Following scaling, left image 210 has a width in the lateral direction of $l_{1s}$, and right image 212 has a width in the lateral direction of $l_{2s}$.

The width scaling of S3D images shown in FIG. 13 can be either linear or non-linear. That is, the widths of images 206 and 208 along directions $l_1$ and $l_2$ can be scaled according to a mathematical function that varies according to only a first power of displacement along the $l_1$ and $l_2$ directions respectively (i.e., a linear function) or according to a mathematical function that varies according to the displacement in a manner that does not correspond only to the first power of the displacement (i.e., a non-linear function). Examples of non-linear functions that can be used to scale the widths of the images are similar to those discussed above in connection with FIG. 12A.

In certain embodiments, for example, the widths of images 206 and 208 along directions $l_1$ and $l_2$ are scaled non-linearly by applying a tangent scaling function. The extent of scaling is determined by processor 110 based on the vergence angles of the images, the distance between the viewer and screens 102 and 104, and in response to any changes in convergence angles of devices 106 and 108.

The lateral scaling is based on angular projections of the frontoparallel images to a virtually rotated image plane. Processor 110 applies additional image projections such that images to be displayed appear to be rotated with respect to the frontoparallel plane, but keeping the retina projection of each eye's view to be uniform. For example, the image for the left eye view is projected to a plane rotated clockwise in depth. As a result, the left portion of the image appears to be progressively compressed while the right side of the image appears to be progressive stretched, a tangential (e.g., non-linear) projection. For the right eye view image, an opposite direction (counter-clockwise) angular projection is applied.

The amount of rotation is determined by the vergence angle to the center of the screen (which is a function of the IPD and viewer screen distance). However, the amount of angular projection also depends on the viewer position with respect to the center of the screen, such that the actual angular rotation is half of the vergence angle plus a viewer's positional angle respect to the center of the projection screen.

In the foregoing example, images 202 and 204 in FIG. 12A are scaled two-dimensionally (i.e., in both height and width) to correct for distortions associated with displaying S3D images to a user. In many applications, such two-dimensional scaling operations are performed to correct for both scene-mapping related distortions and angular disparity-related distortions in the S3D images. However, it should be appreciated that while the foregoing example corrects images in two dimensions, in certain embodiments, the systems disclosed herein can selectively correct S3D images by only applying one of the two corrections. That is, corrections for projection-related distortions and depth-related distortions can be applied separately from one another, and in some embodiments, only one of these corrections can be applied. Depending upon the specific configuration of system 100, for example, one type of correction can be omitted.

System 100 can be implemented in a variety of configurations, including large projection rooms and head-mounted displays (HMDs). When system 100 is implemented as a HMD, physical rotation of screens 102 and 104 can be practical to implement, as such displays typically include two screens. In such systems, however, S3D images typically include further distortions due to lens-related aberrations, which can sometimes be large because HMDs typically provide larger viewing angles than desktop/projection stereoscopic displays, and very high power lenses are used between the display screens and the viewer's eyes. High power lenses used for such purposes typically have high aberrations. Moreover, since both projection-related distortions and lens-related distortions are larger at larger viewing eccentricities, the foregoing factors increase depth-related distortions, which can lead to severe motion sickness-like symptoms when viewing stereoscopic scenes using HMDs.

In some embodiments, processor 110 is configured to correct for lens-related aberrations by applying another space-mapping procedure. Typically, the lens-related space-mapping correction involves warping the S3D images according to a fixed distortion correction function, under the assumption that the viewer's eye positions are perfectly aligned on the lens axes. As used herein, "warping" refers to a process in which an image is stretched or compressed in one or two dimensions, linearly or non-linearly. When warping occurs in two dimensions, the stretching or compression can be the same or different in the two dimensions. Where warping occurs differently in two dimensions, the overall shape of the image and the relative positions between objects in the image can change.

System 100 can include position-adjustable lenses so that a user of system 100 can manually adjust the lenses to align with his/her eyes (i.e., perform IPD adjustment). If suitable lens-eye alignment cannot be achieved, a fixed distortion correction function may not be sufficient to correct for all lens-induced aberrations. Accordingly, processor 110 is configured in certain embodiments to apply a modified correction for lens-induced aberrations, where the modification is determined by processor 110 based on the extent of lens-eye misalignment.

In some embodiments, a suitable warping function can be derived from ray-tracing analysis of distortions in imaging paths along which image capture devices 106 and 108 are positioned. In this implementation, on-axis lens distortion can be measured by a standard grid intersection calibration method. Intersections of the grid are marked by different color so that the positions of the intersections can be easily extracted during later image processing. The captured image through the lens is obtained using a well calibrated camera and the locations of the intersections are converted to ratios of distance with respect to the farthest intersection from the center intersection. This grid of intersections is then used as an image warping baseline, and the captured image can be warped based on the baseline distribution of intersection points so that the image to be projected will be pre-distorted (or un-distorted) following the distorted capture.

For off-axis lens aberrations (e.g. due to lens-eye misalignment), the aberration pattern can be estimated through mathematical lens modeling, which accounts for the geometric shape and refraction index of the lens (e.g., ray tracing analysis). The angular projection of the intersections through the lens model are displayed on a screen, and the direction and amount of lens-eye misalignment can be adjusted until the grid view provides the most uniform distribution of intersections.

In real-world viewing conditions, if a viewer shifts his/her head position laterally while fixating on an object, the depth structure appears to be rotated in the opposite direction to the viewer's head movement, but the perception of depth structure remains stable because of the vestibular and proprioceptive signals that register the self-motion. However, when the same scene is viewed in a stereoscopic display, as discussed above, the viewer's lateral position shift introduces a rotation of the stereoscopic depth axis that appears to be following the shifting viewer. As a result, the whole 3D depth structure appears to be rotating in the same direction as the viewer's head movement. This rotation of the viewing angle causes exocentric motion with the same amount of angular rotation being applied to the 3D depth structure, regardless of how far/close the real objects are located, resulting in a perceived distortion of the displayed stereoscopic view.

The problem becomes more severe if other visual cues indicate that the scene is stationary. The motion parallax predicts that closer objects make a large retinal slip and are subject to more of a pre-occluded view, while objects that are farther away from the viewer create a smaller retinal slip, and so are perceived as a relatively stationary background due to linear perspective rules. Since a stereoscopic image only shows a single view from a particular viewpoint that is independent of the viewer's egocentric motion, lateral changes in the viewer's viewpoint do not provide any additional view of close objects. This creates the illusion of unnatural rotation of the scene, where the viewer expects to see a larger change in the view of close objects and less retinal slip of farther-away objects, but instead there appear no changes to the view of the scene.

To correct for lateral shifts in the viewer's head position, system 100 can track the position of the viewer's head. Referring again to FIG. 11, in some embodiments, system 100 can include a tracking apparatus 120 configured to detect changes in the position of the head of a user of system 100. Tracking apparatus 120 can be implemented in various ways. For example, in certain embodiments, tracking apparatus 120 can include one or more cameras that track the viewer's eyes. Tracking apparatus 120 can report the orientation of the viewer's eyes to processor 110 or deliver image information to processor 110 that the processor can use to determine the orientation of the viewer's eyes. As another example, in certain embodiments, linear tracking sensors (e.g., magnetic sensors) can be used to track the viewer's head position. As shown in FIG. 11, tracking apparatus 120 is electrically connected to processor 110, so that processor 110 can receive tracking signals and apply appropriate corrections to the S3D images to account for changes in head position.

A shift in the position of the viewer's head may make it necessary to generate a new set of perspective views of the scene from different points of view. Once the new set of perspective view has been generated, the views are corrected as described above. The process can be straightforward when the perspective views are generated from a 3D virtual model. In some instances, new views can be generated from existing stereoscopic images (e.g., a S3D movie), but may be subject to occlusion. In general, head tracking and generating new perspective views can be done with real-time 3D computer rendering and/or multi-view scene capture techniques.

Hardware and Software Implementation

The steps described herein can be implemented in electrical circuits, in logic units, and/or in one or more electronic processors (e.g., processor 110) executing programs generated using standard programming techniques. Such programs are designed to execute on programmable computers, processors, or specifically designed integrated circuits, each optionally comprising an electronic processor, a data storage system (including memory and/or storage elements), at least one input device, and least one output device, such as a display. The program code is applied to input data to perform the functions described herein and generate output information, which is applied to one or more circuit components. Each such program can be implemented in a high-level procedural or object-oriented programming language, or an assembly or machine language. Each such program can be tangibly embodied in a computer readable storage medium (e.g., optical disc, magnetic storage medium, or a persistent solid-state storage medium) that, when read, can cause the processor to perform the analysis and control functions described herein. Electronic processors can, in general, be configured through software instructions to perform any of the method steps, analysis functions, and control functions disclosed herein.

Other Embodiments

A number of embodiments have been described. Nevertheless, it will be understood that various modifications may be made without departing from the spirit and scope of the disclosure. Accordingly, other embodiments are within the scope of the following claims.

What is claimed is:

1. A three-dimensional stereoscopic imaging system, comprising:
   two image capture devices configured to obtain images of a scene;
   at least one display screen configured to pivot about an axis; and
   an electronic processor configured to:
      receive one or more images of the scene from the capture devices, wherein each of the one or more images comprises a lateral dimension and a height;
      warp the one or more images along their respective lateral dimensions to at least partially correct for disparity distortions associated with displaying the one or more images on the at least one display screen;
      correct the one or more images by scaling the respective heights of the images along the lateral dimensions of the images so that the height of each image is the same along the image's lateral dimension;
      synchronously adjust an orientation of the at least one display screen about the pivot axis based on viewing directions associated with the two image capture devices; and
      display the warped and corrected one or more images on the at least one display screen.

2. The system of claim 1, wherein the electronic processor is configured to warp the one or more images by applying a non-linear warping function to the one or more images.

3. The system of claim 1, wherein the electronic processor is configured to scale the respective heights of the images according to a linear scaling function.

4. The system of claim 1, wherein each of the two image capture devices is configured to obtain an image of the scene, wherein the two image capture devices are positioned so that the images obtained by the devices correspond to different viewing directions, and wherein the different viewing directions correspond to left and right viewing directions relative to a position of a user of the system.

5. The system of claim 4, wherein the at least one display screen comprises two display screens, and wherein the electronic processor is configured to display a first one of the warped and corrected images on a first one of the display screens, and to display a second one of the warped and corrected images on a second one of the display screens.

6. The system of claim 5, wherein the first display screen corresponds to the left viewing direction, and wherein the second display screen corresponds to the right viewing direction.

7. The system of claim 1, wherein the system is configured as a head-mounted display.

8. The system of claim 1, further comprising a tracking apparatus configured to detect a shift of a head of a user of the system.

9. The system of claim 8, wherein the tracking apparatus is configured to transmit information about changes in a position of the user's head to the electronic processor, and wherein the electronic processor is configured to warp the one or more images based on the transmitted information.

10. The system of claim 2, wherein the warping function is derived from ray-tracing analysis of distortions in imaging paths along which the image capture devices are positioned, and wherein the warping function comprises corrections corresponding to at least some of the distortions.

11. A method of correcting stereoscopic images, the method comprising:

obtaining one or more images of a scene using two image capture devices, wherein each of the one or more images comprises a lateral dimension and a height;

warping the one or more images along their respective lateral dimensions to at least partially correct for disparity distortions associated with displaying the one or more images on at least one display screen;

correcting the one or more images by scaling the respective heights of the images along the lateral dimensions of the images so that the height of each image is the same along the image's lateral dimension;

synchronously adjusting an orientation of at least one pivotable display screen about a pivot axis based on viewing directions associated with the two image capture devices; and displaying the warped and corrected one or more images on the at least one pivotable display screen.

12. The method of claim 11, further comprising warping the one or more images by applying a non-linear warping function to the one or more images.

13. The method of claim 11, further comprising scaling the respective heights of the images according to a linear scaling function.

14. The method of claim 11, wherein the one or more images of the scene comprises two images of the scene, and wherein the two images correspond to different viewing directions of the scene.

15. The method of claim 14, wherein the different viewing directions correspond to left and right viewing directions, relative to a position of a user viewing the warped and corrected one or more images, the method further comprising displaying the warped and corrected image corresponding to the left viewing direction on a first display screen, and displaying the warped and corrected image corresponding to the right viewing direction on a second display screen.

16. The method of claim 11, further comprising detecting a change in position of a head of a user viewing the warped one or more images.

17. The method of claim 16, further comprising warping the one or more images based on information about the change in position of the user's head.

* * * * *